United States Patent
Baer et al.

(10) Patent No.: US 9,851,236 B2
(45) Date of Patent: Dec. 26, 2017

(54) DEVICE FOR DETERMINING THE FILL LEVEL OF A MEDIUM

(71) Applicant: KROHNE Messtechnik GmbH, Duisburg (DE)

(72) Inventors: Christoph Baer, Hattingen (DE); Thomas Musch, Bochum (DE); Michael Deilmann, Essen (DE); Attila Bilgic, Ratingen (DE); Stephan Neuburger, Stadecken-Elsheim (DE)

(73) Assignee: KROHNE Messtechnik GmbH, Duisburg (DE)

( * ) Notice: Subject to any disclaimer, the term of this patent is extended or adjusted under 35 U.S.C. 154(b) by 80 days.

(21) Appl. No.: 14/980,429

(22) Filed: Dec. 28, 2015

(65) Prior Publication Data

US 2016/0202106 A1 Jul. 14, 2016

(30) Foreign Application Priority Data

Jan. 13, 2015 (DE) .................. 10 2015 100 415

(51) Int. Cl.
*G01F 23/284* (2006.01)
*G01F 23/00* (2006.01)

(52) U.S. Cl.
CPC ...... *G01F 23/2845* (2013.01); *G01F 23/0061* (2013.01)

(58) Field of Classification Search
CPC .................. G01F 23/2845; G01F 25/0061
See application file for complete search history.

(56) References Cited

U.S. PATENT DOCUMENTS

| | | | |
|---|---|---|---|
| 3,213,439 A | 10/1965 | Atkinson | |
| 5,861,811 A | 1/1999 | Lease et al. | |
| 6,218,990 B1 | 4/2001 | Grangeat et al. | |
| 6,606,904 B2 * | 8/2003 | Muller | G01F 23/284 324/639 |
| 6,962,078 B2 | 11/2005 | Angal et al. | |
| 7,068,213 B2 * | 6/2006 | Muller | G01F 23/284 342/124 |
| 7,408,501 B2 | 8/2008 | Rolfes et al. | |
| 7,710,328 B2 | 5/2010 | Schultheiss et al. | |
| 7,730,780 B2 | 6/2010 | Neven et al. | |
| 8,397,566 B2 * | 3/2013 | Michalski | G01F 23/284 333/24 C |
| 8,474,314 B2 | 7/2013 | Neuburger et al. | |

(Continued)

FOREIGN PATENT DOCUMENTS

DE 195 16 789 A1 11/1996
DE 198 25 501 A1 12/1999

(Continued)

*Primary Examiner* — Lisa Caputo
*Assistant Examiner* — Punam Roy
(74) *Attorney, Agent, or Firm* — David S. Safran

(57) ABSTRACT

A device for determining the fill level of a medium in a container having at least one electronic device and at least one signal conductor arrangement. The electronic device supplies the signal conductor arrangement 5 with electromagnetic signals. To provide a device for determining the fill level, the signal conductor arrangement has several emitting devices and the electronic device provides at least one measure for an emitting behavior of at least one emitting device.

8 Claims, 9 Drawing Sheets

(56) References Cited

U.S. PATENT DOCUMENTS

| | | | |
|---|---|---|---|
| 8,933,789 B1* | 1/2015 | Fink | G06Q 10/087 340/10.1 |
| 8,985,468 B1* | 3/2015 | Fink | G06Q 10/087 235/487 |
| 9,336,421 B1* | 5/2016 | Fink | G06Q 10/087 |
| 2001/0015099 A1* | 8/2001 | Blaine | G01F 23/284 73/290 R |
| 2002/0040596 A1* | 4/2002 | Muller | G01F 23/284 73/290 V |
| 2011/0094299 A1* | 4/2011 | Muller | G01F 23/0076 73/290 V |
| 2012/0056774 A1* | 3/2012 | Wennerberg | G01F 23/284 342/124 |
| 2013/0207836 A1* | 8/2013 | Schmitt | G01F 23/284 342/124 |
| 2013/0220013 A1 | 8/2013 | Fitz | |
| 2015/0082881 A1 | 3/2015 | Blodt | |
| 2015/0268084 A1* | 9/2015 | Southern | G01F 23/284 188/269 |
| 2016/0202106 A1* | 7/2016 | Baer | G01F 23/2845 73/290 R |

FOREIGN PATENT DOCUMENTS

| | | |
|---|---|---|
| DE | 199 35 743 A1 | 2/2001 |
| DE | 199 34 041 A1 | 3/2001 |
| DE | 100 23 850 A1 | 11/2001 |
| DE | 101 63 199 A1 | 7/2003 |
| DE | 10 2004 016 725 A1 | 2/2006 |
| DE | 600 24 624 T2 | 9/2006 |
| DE | 10 2006 019 688 A1 | 11/2007 |
| DE | 699 36 903 T2 | 5/2008 |
| DE | 10 2008 050 445 A1 | 4/2010 |
| EP | 1 128 169 A1 | 8/2001 |
| EP | 1 701 142 A2 | 9/2006 |
| EP | 1 956 349 A2 | 8/2008 |
| WO | 97/37198 A1 | 10/1997 |
| WO | 2009/121530 A1 | 10/2009 |
| WO | 2013/167384 A1 | 11/2013 |

* cited by examiner

DEVICE FOR DETERMINING THE FILL LEVEL OF A MEDIUM

BACKGROUND OF THE INVENTION

Field of the Invention

The invention relates to a device for determining the fill level of a medium in a container. The device has at least one electronic device and at least one signal conductor arrangement. The electronic device supplies the signal conductor arrangement with electromagnetic signals.

Description of Related Art

The medium is, for example, bulk goods or a liquid and the container is, for example, a tank, a silo or a channel. The signals are, in particular, high frequency or microwave signals.

It is known in industrial process automation either to continually measure the fill level of the medium or to specifically monitor particular limit levels.

Such devices for monitoring limit levels are also called fill level or limit level switches. They are used, for example, depending on the mounting position, for overflow protection, idle state protection or pump protection.

If the medium reaches a predetermined fill level or falls below such, the switches generally generate a signal that, e.g., interrupts a fill process or triggers a safety mechanism or causes the closing of a drain valve.

It is known, for example, to detect limit levels capacitively e.g., German Patent Application DE 100 23 850 A1, using conductivity measurement e.g., International Patent Application Publication WO 97/37198 A1 and corresponding U.S. Pat. No. 5,861,811 or using mechanically swingable sensors e.g., German Patent Application DE 198 25 501 A1.

Furthermore, a device is known from International Patent Application Publication WO 2013/167384 A1 and corresponding U.S. Patent Application Publication Patent 2015/082881 for detecting a limit level of a medium, in which the frequency of an output signal of a resonator is evaluated. The resonator is in contact with the interior of the chamber that contains or conducts the medium. Detection thereby occurs in that the frequency of the resonator is exploited depending on the dielectric constant of the medium. In one design, the resonator is designed as a micro strip line or as an emitting device.

It is known from a completely different field of application to determine the moisture of objects in a container using reflector switches, see German Patent Application DE 10 2004 016 725 A1.

A strip line antenna for fill level recognition is, for example, provided in German Patent Application DE 199 35 743 A1. Thereby, in one design, two receivers for microwave signals are used for the redundant monitoring of the fill level.

An exemplary design of emitting devices that are used in the field of fill level measurement is disclosed in German Patent Application DE 10 2006 019 688 B4 and corresponding U.S. Pat. No. 7,710,328. Such emitting devices consist in general of metal surfaces that are present on or in printed circuit boards or other substrates.

It is additionally known in the prior art to further add metal surfaces acting as reflectors.

So-called patch antennae are also known in the prior art other terms are "flat antenna" or "micro strip antenna". An array is created by interconnecting several antennae. It is thereby known to create different resonance structures: half-wave or quarter-wave, see e.g., DE 699 36 903 T2 and corresponding U.S. Pat. No. 6,218,990. Panel antennae can be used for measuring the surface structure of media, see e.g., European Patent Application EP 1 701 142 A2 and corresponding U.S. Pat. No. 7,408,501.

Panel antennae that are arranged in ceramic structures are used for fill level recognition, for example according to International Patent Application Publication WO 2009/121530 A1 and corresponding U.S. Pat. No. 8,474,314.

In the fill level switch according to European Patent Application EP 1 956 349 A2 and corresponding U.S. Pat. No. 7,730,780, electromagnetic signals are coupled into each of a measuring conductor arrangement and a resonance conductor arrangement, wherein the signal of the measuring conductor arrangement can interact with the medium, whose fill level is to be monitored.

A device having microwave sensors for the specific use of monitoring the fill level of a blood reservoir is described in German Patent Application DE 195 16 789 B4. These sensors are attached outside of the reservoir and radiate through its wall. It is described, in one design, that several sensors are attached at the same level. It is further provided that sensors are attached at different levels in order to already be able to signal that the fill level is approaching a critical limit level.

Contaminants or the deposition of medium on the container wall or especially on the sensors are problematic for the above-mentioned devices or, respectively, limit level switches. This can lead to false signals or can even prevent the detection of the reaching or falling below a fill level.

Originating from these problems, it is known, for example, in membrane oscillators to shake off gas bubbles during a cleansing phase see German Patent Application DE 10 2008 050 445 A1.

In safety-critical uses, it is further known to design the sensors or devices redundantly. In the simplest case, two measuring devices are used that have the same function.

In particular, the following types of redundancy are thereby differentiated:

In hot spare, several sensors are actively operated. A so-called voter evaluates the individual results, wherein, if necessary, the majority decides.

In cold redundancy, several sensors are present, however, only one sensor is active. Based on the evaluation of the signals of this individual sensor, further sensors are activated, if need be.

In standby or passive redundancy, again, several sensors are present and, again, only one sensor is active. The non-active sensors are thereby in a standby state. In the case of an error of the active sensor, another sensor is switched on.

Thereby, the redundancy can be homogeneous or diverse. This means, for example, that either the same type of sensor or the same components are multiply used, or that the individual sensors or components come from different producers or are based on different principles.

SUMMARY OF THE INVENTION

The object of the invention is to provide a device for determining the fill level that is advantageous compared to the prior art.

The device according to the invention in which the above derived and described object is achieved is initially and essentially wherein the signal conductor arrangement has several emitting devices and that the electronic device provides at least one measure for an emitting behavior of at least one emitting device.

The electromagnetic signals are, in particular, microwave signals. Thus, in one design, the device according to the invention can, in particular, be called a high frequency HF fill level switch.

The emitting devices, of which at least two are present and which also can be called individual elements of the HF fill level switch, are to be understood as impedance converters in one design.

Thereby, the wave impedance of a line, via which the electromagnetic signal is supplied to the emitting devices, is adapted to the wave impedance of the area in front of the emitting devices. This area is, in particular, a free space in the case that the device is used as overflow protection.

In that the impedance matching is monitored, it can be assumed that when a change in the matching occurs, a change in the space in front of the emitting device has occurred. In the case of the use as a limit level switch, this is a change in the degree of coverage.

The emitting devices are, in one design, designed as antennae and, in a further design, in particular, are designed as patch antennae.

Preferably, the emitting devices or patch antennae are designed to be flat.

The emitting devices preferably have a relatively narrow-band impedance matching.

In patch antennae as an exemplary design for emitting devices, such a narrowband impedance matching can be ascribed to the half-wavelength resonance being implemented via a patch antenna. Thereby, only the frequency whose half-wavelength is as large as the geometric length of the patch antenna experiences impedance matching.

In one design, the emitting devices are designed in such a manner that the direction of emission is orthogonal to both directions of expansion of the emitting device designed as antenna.

The materials surrounding the respective emitting device or the respective patch antenna are important for impedance matching, since the materials shorten the wavelength of the signal, for which impedance matching occurs, by the root of the effective permittivity.

The permittivity, commonly denominated with the Greek lowercase epsilon $\varepsilon$, is also called dielectric conductivity or dielectric function and describes the permeability of a material for electrical fields.

The link between material permittivity and impedance matching characteristic is used in the device according to the invention in order to identify the fill level of the medium in a container.

If the material e.g., due to an exchange of air to the medium to actually be detected, and thus also the permittivity, in front of an emitting device or, in particular, in front of a patch antenna changes, then the effective permittivity around the antenna/emitting device changes as does the frequency that represents an impedance matching for the emitting device.

Thus, on the other hand, if a change in the impedance matching is recognized by the device according to the invention, then this can be ascribed to a change in the fill level.

Additionally or alternatively, a change in the material characteristics is concluded.

The above correlations can also be described in other words as follows for the exemplary use as overflow protection:

If an emitting device is supplied with an electromagnetic signal, whose frequency is the same as the resonance frequency that is set by the emitting device not covered by medium, i.e., free, and if the emitting device is not covered by medium during supply with the signal, then the signal is emitted in the interior of the container, which is, e.g., a tank.

Since, in this case, no or very little reflection occurs on the emitting device designed as antenna, the energy of the wave returning from the emitting device is extremely small.

If the fill level of the medium in the container changes so that the emitting device is reached, then the resonance frequency of the emitting device is also shifted. However, the supplied electromagnetic signal thereby experiences a stronger reflection, which in turn results in a greater energy of the returning wave.

Depending on the magnitude of change of permittivity that results from that transition between a free emitting device and one covered with medium, the emitting device emits at a different, neighboring frequency small permittivity change or there is no longer any emission large permittivity change.

The described effect can be understood as a near field effect of the antenna or, respectively, the emitting device.

The measure for emitting behavior of at least one emitting device determined by the electronic device consists, in one design, of identifying that the resonance frequency of the at least one emitting device has changed. Based on this change, it can then be concluded that the degree of coverage of the emitting device by the medium in the container has changed or that a change in the medium itself exists.

Due to the plurality of individually operable emitting devices, several individual results are available that can be combined for determining the fill level.

The measuring results of the—in particular, of all—emitting devices are, thus, in one design, processed into one overall result using a suitable processing unit e.g., a measuring device or, in general, an electronics unit, which is implemented by a microprocessor. In another design, the individual results are consolidated using logical units.

The following designs relate to advantageous designs of the device that are used, in part, for implementing the above-described correlations.

It is provided in one design that the electronic device evaluates at least one impedance behavior of the at least one emitting device as a measure for the emitting behavior of at least one emitting device.

In this design, the electronic device preferably monitors the impedance matching of at least one emitting device.

If the impedance matching changes, this is, in one design, ascribed to a change arising in front of the emitting device, i.e., in particular within the container and thus on the emitting side of the emitting device. This change is thereby interpreted, in particular, as a change in fill level and is signalized as such.

In an associated design, the electronic device determines an impedance value and/or a change of impedance of at least one emitting device.

In one design, the electronic device determines an absolute value for the impedance and, additionally or alternatively, determines whether the impedance has changed.

In one design, at least one input reflection of the at least one emitting device is determined by the electronic device for the measure of the emitting behavior. In this design, the electronic device evaluates the input reflections of at least one emitting device that yields signals as a result of the supply with electromagnetic signals. The reflection is thus, in this design, a measure for adapting the electromagnetic signals to the present resonance conditions.

In one design, the electronic device supplies at least one emitting device with electromagnetic signals of a predeterminable frequency.

The frequency, in one design, depends on whether the device according to the invention is used as overflow protection or as idle state protection, i.e., whether a change from uncovered to covered state or from covered to uncovered state is to be detected.

In a further design, the frequency depends on the material characteristics such as e.g., permittivity of the material surrounding the emitting device. This, thus, also relates to the nature of the support element or to a possibly existing protection layer.

If all emitting devices are located in or on one support element, then this simplifies the assembly in the process area due to the reduction to one mechanical component.

In one design, several emitting devices are supplied with the same electromagnetic signal.

In one design, the predeterminable frequency of the electromagnetic signals corresponds essentially to the resonance frequency of the emitting device not covered by medium. In this design, it is detected when the medium reaches the relevant emitting device, i.e., overflow protection takes place.

In an alternative design, i.e., in particular when used as pump protection or idle state protection, the predeterminable frequency essentially corresponds to the resonance frequency of the emitting device covered by the medium.

If the medium in front of the emitting device changes or if the emitting device is no longer covered by medium, then the frequency of the signals supplied to the emitting device no longer corresponds to the current resonance frequency. This can be accordingly detected by the electronic device and identified or signalized.

In an additional or alternative design, the electronic device varies the frequency of the electromagnetic signals that are supplied to an emitting device or several emitting devices within a predeterminable frequency band. In this design, a frequency sweep is carried out and the frequency behavior of the emitting device or emitting devices is measured thereby. This allows for a very exact determination of the current resonance frequency, for example in a plurality of measuring surroundings or process conditions, which in turn can be informative about the surroundings and thus also about the measuring medium.

It is provided in one design that the electronic device has at least one reflector switch for the actual determination of the fill level by the individual emitting devices, i.e., whether the fill level has been reached or not.

Thereby, the reflector switch is assigned to one emitting device.

Furthermore, the reflector switch is designed in such a manner that is provides a measure for an emitting behavior of an emitting device.

The reflector switch detects whether the emitting device is covered by the medium or whether, e.g., gas or common ambient air is located in front of the emitting device.

The measure for the emitting behavior, in one design, is found in the information of whether or not the medium covers the emitting device.

The following exemplary designs are given for the reflector switches or, in general, the metrological design of the electronic device.

The respective emitting device is continuously supplied with a mono-frequency signal in an absolute value CW continuous wave detection. The frequency is chosen in one design so that it corresponds to the resonance frequency of the emitting device in the case that the medium does not come into contact with the antenna. Thus, if the antenna is free, it emits the electromagnetic signal.

The reflector switch thus permanently monitors the adapting of the antenna at the set supply frequency.

In one design, the reflector switch issues a DC voltage that is dependent on the relation between the power supplied to the antenna and the reflected power.

A comparator that is downstream from the reflector switch in the electronic device compares, in one design, the generated DC voltage from the reflector switch with an external predetermined reference voltage and generates an evaluation.

If there is no medium or ambient air in front of the antenna—when used as overflow protection, i.e., detecting when the fill level has been reached—then the antenna is adapted and its input reflection is small. Thus, the reflector switch generates a voltage that is below the reference voltage so that the comparator issues a low level.

If the medium is located in front of the antenna—in the above-mentioned use—the resonance frequency is shifted and the antenna has a worse adapting behavior for the applied frequency of the signal. Thus, the input reflection of the antenna is increased and, thus, also the DC voltage generated by the reflector switch. If the DC voltage is greater than the reference voltage, the comparator issues a high level that signalizes that the limit level has been reached.

In the case that the respective emitting device is covered by a protective layer, or in the case that the medium to be detected has a very low permittivity, in one design, it is provided that the above-described absolute value CW detection is broadened to a complex detection.

Thereby, as an addition to the above design, both the signal supplied to the emitting device as well as the reflection signal tapped by the antenna are separated. In addition to the above-described simple reflector switch, both signals are also supplied to a second measuring or evaluating site. A 90° phase shifter is thereby provided in one of the two signal paths.

The above-mentioned reflector switch supplies the "in-phase" signal and the second measuring site supplies the "quadrature" signal.

Both signals are preferably digitized, in one design, for example, in order to be further processed in a microprocessor. Hereby, a phase evaluation of the reflected signal is then possible. This has the advantage that the phase shift due to the reflection of the signal on the medium is a very sensitive measure.

In the case, in which the medium causes large losses of the signal of the emitting devices, the adaptation curve of the antenna broadens over the frequency.

In order to still reliably detect the reaching of a limit level, it is thus provided that, in one design, a broadband adaptation curve of the emitting devices is determined, i.e., measured.

Thus, in one design, the emitting devices are supplied with signals that lie within a predeterminable frequency range.

The DC voltage of the respective reflector switch is directly digitized in one design. This allows for the respective value of the reflection to be assigned to the frequency of the signal that is supplied to the respective emitting device.

After a complete frequency sweep, the obtained adaptation curve is evaluated, wherein the lowest determined DC voltage of the reflector switch is assigned to the resonance frequency of the emitting device.

In one design, the broadband detection is combined with the above described complex variation and the phase evaluation possible therewith.

In one design, the signal that is supplied to the assigned emitting device is supplied to the reflector switch.

In one design, the reflector switch monitors the adaptation of at least one emitting device during supply with the electromagnetic signal.

In one design, the reflector switch is assigned only to one, single emitting device, in that the reflector switch is assigned to exactly one emitting device and provides a measure for the emitting behavior of only the one emitting device.

In a further design, each emitting device is assigned one reflector switch. Thus, in this design, the number of emitting devices is the same as the number of reflector switches.

In another design, the at least one reflector switch is assigned to several emitting devices and provides at least one measure for the emitting behavior of the emitting devices assigned to it.

The individual reflector switches each generate information about whether—depending on the type of use—the medium has reached or fallen below the fill level assigned to the emitting device. The individual results of the reflector switch are then processed or, respectively, completely evaluated in the electronic device.

In one design, the electronic device is designed such that, after an emitting device is supplied with at least one electromagnetic signal, the electronic device taps and evaluates at least one reflection signal from the emitting device.

In the following designs, the pure determination or, respectively, monitoring of the fill level is expanded to further measuring variables.

Thus, in one design, the electronic device determines, in addition to the fill level, at least one further piece of information about the medium based on the emitting behavior of the emitting device.

This further information, in one design, is information about a separating layer between two different phases or substances in the medium of the container.

In an additional or alternative design, the electronic device detects information about a permittivity of the medium.

For example, based on a precise evaluation of at least the reflected signal, information is obtained about the medium that is located in front of the emitting device. The permittivity is thereby used in order to differentiate between different media or in order to determine a change in the medium.

In one design, the presence of different materials is identified based on the permittivity.

In order to identify the medium using the permittivity, in one design, broadband measurement is carried out, in which the electromagnetic signals are run through a frequency band to determine the resonance frequency and, thus, the medium.

The medium that was used for carrying out a calibration of the device according to the invention is also relevant for determining of the additional information.

In one design, the calibration medium is air.

In an alternative design, the medium that is to be monitored and measured is also the calibration medium.

In one design, the phase shift of the complex phasor is evaluated in order to also identify small changes or differences of the permittivities.

In one design, contamination of at least one emitting device due to accumulation of the medium and gradually changing resonance conditions caused thereby is identified.

Overall, a change of resonance behavior of at least one emitting device is determined or identified by the device according to the invention via the electronic device.

Different individual measured values can be generated and unified into an overall picture due to the number of emitting devices that are essentially designed in the same manner. Thus, several individual sensors are combined into one multi-sensor.

In one design, each emitting device is individually evaluated.

The following designs ensue:

In one variation, each emitting device is connected to its own signal feed and its own reflector switch.

In an alternative design, the emitting devices are supplied by a signal source, however, they each have their own reflector switch.

In an additional design, the emitting devices are supplied by a common broadband signal generator. Thereby, however, the lengths of the lines between the signal generator and the individual emitting devices differ from one another such that the reflections occur at times clearly different from one another and allow for assignment to the emitting devices.

In one design, at least a part of the emitting devices are evaluated together.

It is provided in one design that a support element at least partially supports the signal conductor arrangement. At least part of the emitting devices is attached on or in the support element.

In a further design, all emitting devices are located on or in the support element so that the emitting devices can also be mounted at their operation site via the support element.

The majority of emitting devices on one support element can lead to a coupling of the individual emitting devices. This can result in crosstalk of high frequency signals from neighboring emitting devices.

Thus, for example, de-coupling is required using one of the following methods: space-, time-, frequency-, code- and/or polarization division multiplexing.

The device according to the invention is, in particular, a so-called limit level switch that shows whether or not the medium has reached or fallen below a fill level—i.e., a limit level.

The device according to the invention detects the fill level of the medium in that a signal conductor arrangement is supplied with electromagnetic signals and in that it is identified whether the medium covers the signal conductor arrangement.

Thereby, the signal conductor arrangement has several emitting devices, which are each supplied with the electromagnetic signals.

Redundancy, for example, can be created by the plurality of emitting devices. Furthermore, several level limits can be identified. It is additionally possible to verify measurement values.

The signal conductor arrangement, i.e., the emitting devices, is thereby attached in or on a support element. The support element serves as a substrate for supporting a mechanical structure or for easier mounting of the plurality of emitting devices.

The emitting devices are located, at least in part, in particular, on the side of the support element facing the medium—in the mounted state or are at least attached into or on the support element so that an interaction with the medium can take place.

In one design, the emitting devices are separately created components that are introduced to or deposited on the support element after their production.

In a further design, the emitting devices are first created in or on the support element.

The support element is thereby designed, in particular, so that it can be inserted into a wall of the container. The support element can thus be inserted, in particular, into a corresponding recess in the wall, for which the dimensions need to be compatible.

Since the device is, preferably, a limit level switch, the support element can preferably be inserted into a side wall of the container.

In one design, the support element can be screwed into the wall. In this design, the overall result is a fill level or limit level switch designed as a screw-in sensor.

Due to the—at least two—emitting devices, it is detected whether the medium is located close to the respective emitting device or, respectively, covers it. Therefore, depending on the use, the reaching or falling below a fill level assigned to the respective emitting device can be detected.

Depending on the location at which the individual emitting device is located in the mounted state in the container wall, i.e., depending on the installation site, one fill level is monitored by each of the emitting devices.

The fill levels thereby can be different, can be essentially the same, can overlap—depending on the desired measuring accuracy—, or can be adjacent to one another.

Thus, in one design, fill level ranges are defined that are commonly monitored by several emitting devices.

Which fill levels are assigned to the individual emitting devices, on the hand, is determined by the dimensioning and arranging of the emitting devices on the support element as well as by the achievable local resolution of the measurements and, on the other hand, is determined by the end position of the emitting device after assembly.

On that basis, it is provided in one design that the processing of the individual results or individual measurements or, respectively, individual fill level monitoring of the individual emitting devices is adapted to the specific use or, respectively, to the orientation resulting after assembly in relation to the container and is not previously specified.

Due to the plurality of emitting devices, redundancy can, on the one hand, be created in that at least two emitting devices monitor the same fill level or fill level range.

For this, in one design, at least two emitting devices are attached relative to a longitudinal axis of the support element at the same level. In the mounted state in the container, the longitudinal axis can thereby deviate from a longitudinal axis of the container.

Redundancy is configured in this design when the emitting devices in the attached state are located at the same level in the container.

If they are located at different levels of the container, then they are assigned a different fill level, at or below the level that they monitor.

In an additional or alternative design, at least two emitting devices are attached at different levels in relation to a longitudinal axis of the support element. The arrangement of the emitting devices thereby relates to the production of the device and not necessarily to the mounted state in the container.

If the emitting devices are located at different levels, different fill levels can be identified by them, or it is possible to identify the approaching of the medium to a certain level limit. It is thereby also validated whether the limit level has been reached, since—in the case of the use as overflow protection—a lower-lying fill level of the medium has to be reached.

Depending on the mounting position, however, the emitting devices can be assigned the same fill level or a fill level range. In each case, this depends on how the support element is inserted in the wall of the container or what the end position of the support element is.

Dynamic measurements or plausibility checks of the individual measuring signals allow for the detection of different fill levels. Accordingly, the reliability of fill level determination can thereby be respectively increased.

A plurality of individual sensors that are—at least in part—operated individually, and thus, can supply individual measured values or, in particular, switching signals thereby result in the device for fill level determination due to the individual emitting devices.

Thus, the invention also relates to a measuring arrangement having a container and a device for determining the fill level attached to a wall of the container. Thereby, the device described here can also, in particular, be called limit level switch in this context.

The materials of the support element are adapted thereby to the use or to the respective medium.

In one design, the emitting devices are supplied with the same signals, and in a further design, they are supplied with different signals.

In one design, at least one of the emitting devices is an antenna. The antenna is, for example, a miniaturized horn antenna.

In a further design, at least one of the emitting devices is a patch antenna. The patch antenna is comprised of a corresponding conductor structure, as it is known from the prior art.

In particular, in one design, all emitting device are designed essentially identically. Thus, in this design, the emitting devices are either antennae or, in particular, patch antennae.

The conductor structures or antennae thereby consist, at least in part, of a metal such as, e.g., copper, silver, gold, or nickel.

In that the emitting devices are arranged on a common support element or substrate, or generally close to one another, there is a risk that the antennae couple with one another.

The following examples are possible variations for de-coupling:

In one variation, metal surfaces particular designs are also called "via fences" or "picket fences" are arranged between the individual emitting devices. In such a separation, a completely parallel operation of all emitting devices is possible.

Further separation is implemented in one design in that different running lengths are created for the signals between a signal source and the individual emitting devices. Thereby, a signal coming from the signal source reaches the emitting devices at different points in time.

A parallel operation of all emitting devices is only conditionally possible in the case of such a temporal separation. Due to the rapid—compared to typical change of the fill level—method of detection, the measurements via the individual emitting devices occur quasi simultaneously.

A separation in the frequency range is further or additionally provided in that the emitting devices are supplied with signals having different frequencies.

Additionally or alternatively, the emitting devices differ from one another in view of their resonance frequency due to their geometry or materials, so that this already denotes a de-coupling.

In one design, a further separation is achieved by code multiplexing. Thereby, the signals of the signal source are encoded, wherein each emitting device is assigned one code sequence.

Thus, in one design, a filter is located in front of the emitting devices, which allows the signals to pass to the respective emitting device according to their code sequence. The same occurs in front of the reflector switches, so that only the respective suitable returning signals are evaluated.

In one design, at least a portion of the emitting devices differs from another portion at least in view of the spatial polarization of the respectively emitting electromagnetic signals. The individual emitting devices, thus, each have different preferred polarization and emit signals having different spatial polarization.

In one design, emitting devices have polarization that is at right angles to the adjacent device.

In one design, further structures are provided for de-coupling, so that a portion of the emitting devices, in particular also in conjunction with a spatial gap, emits signals with the same polarization.

It is provided in one design that at least a portion of the emitting devices is arranged essentially rotationally symmetrical in relation to the support element.

In one design, the support element is separated into several angle sections on one side, in each of which at least one emitting device is located.

The angle sections, in particular, have the same size in one design.

If, in this design, a subcategory of n emitting devices from a total of m emitting devices is distributed evenly over a support element—that is circularly designed, at least in this area that supports the emitting device—then each of the n emitting devices is assigned an angle section of 360°/n.

At least one further emitting device, in one design, is located in the middle of the support element or in the middle of the rotationally symmetrical arrangement of emitting devices, which thus also represents the center of the arrangement of—preferably rotationally symmetrically arranged—emitting devices.

In an alternative design, the middle is free of emitting devices.

In an additional design, more than one emitting device is arranged centrally on the support element.

The rotational symmetry is, in particular, advantageous with the design of the support element in that the support element is screwed into the wall of the container. Thus, any free rotation is possible and a predetermined end position does not necessarily have to be achieved.

In one design, the support element is essentially disk-shaped. This form makes the insertion into the wall of the container easier.

Thereby, the form of the wall or a recess in the wall and the outer geometry of the support element are attuned to one another such that screwing in—preferably with a sealing function—is possible.

In order to attach the support element in the container, it is provided in one design that the support element has an outer surface designed as an outer threading. The type of threading is, thereby, to be matched to an inner threading of a recess in the container wall or possibly to an adapter to be correspondingly provided.

In an alternative or additional design, the support element can be sealingly inserted into the wall of the container.

In one design, the support element can be screwed so tightly into the wall, that a sealing function results.

In a further variation, at least one sealing lip is provided and in an additional variation, recesses are provided for sealing elements, e.g., O-rings or for the insertion of a sealing material.

In a further design, an adapter is provided, which, in particular, allows an alignment of the support element or the emitting devices in relation to the container.

The support element is formed, at least in part, of a multi-layer ceramic, wherein at least a portion of the emitting devices is arranged between the individual layers of the multi-layer ceramic. The emitting devices are thus protected from the medium by the support element. However, the support element is thereby designed in such a manner that an interaction between the emitting device and the medium is still possible.

In one design, the support element is formed at least in part of a ceramic and/or of a plastic and/or of glass.

Additionally or alternatively, the support element is formed, at least in part, of a circuit board material or of a HF substrate.

In one design, the support element is produced essentially entirely of one of the above-mentioned materials.

In one design, wherein the support element is of ceramic, the emitting devices and also the supply and outlet lines are generated, e.g., using a thin or thick layer method.

In a further design, the support element is designed to be flat, at least on the side facing the medium.

In an alternative design, the support element has a convex or concave course on the side facing the medium.

The outer contour of the support element contributes to the medium or possibly occurring condensate flowing or dripping from the support element.

In one design, the device allows for use in an area at risk for explosion. For this, in particular, the components and especially the emitting devices are accordingly dimensioned and designed.

Thus, in one design, it is particularly provided that a electrically nonconductive surface facing the medium or the process has a maximum size of 4 square centimeters.

Alternatively, the electrically nonconductive part of the surface of the support element facing the medium is surrounded by a metallic, grounded structure, wherein the projection surface of this framed surface is less than 16 square centimeters.

In order to protect the emitting device from the medium or from the process conditions prevailing in the container, at least one protective layer is provided in one design.

The protective layer is thereby applied in the direction of the medium or process or container interior in front of an emitting device or in front of the entirety of the emitting devices.

In one design, the protective layer is dielectric.

In one design, the protective layer is a coating.

Depending on the design, the protective layer thereby is formed, at least in part, of a diamond-like carbon material DLC coating and/or of a polytetrafluoroethylene PTFE and/or of glass.

In a further design, the protective layer consists of a silicon oxide e.g., silicon monoxide or dioxide.

In order to prevent the medium from adhering, it is provided in one design that the protective layer at least partially exhibits the lotus effect.

Furthermore, the protective layer in one design is at least partially porous and in an additional or alternative design is at least partially closed.

The invention further relates to a method for determining the fill level of a medium in a container.

The following description of the method or, respectively, the method variations and characteristics can thereby also be implemented using corresponding designs of the device described above so that the following implementations also accordingly apply to the device. Conversely, the implementations and examples of the device also apply for implementation of the method and can be carried out as a method.

The method is initially and essentially wherein several emitting device are supplied with electromagnetic signals and that an emitting behavior of at least a part of the emitting devices is evaluated in view of the fill level of the medium.

The electromagnetic signals in one design are high frequency or microwave signals.

The emitting devices can also be seen as individual sensors that are combined or whose measurement results are combined for determining the fill level or further measuring variables, e.g., in respect to the medium.

The emitting devices, of which there are at least two, are supplied with the electromagnetic signals for measurement.

In one design, there is a constant supply. In an alternative design, a clocked supply is carried out. Supply is demand driven in one design and in an additional or alternative design, supply depends on whether a predeterminable energy quantum is present.

In one design, the emitting devices are antennae that emit electromagnetic signals or, respectively, couple the electromagnetic signals in the space in front of the side of the emitting device facing the medium or the interior of the container.

An emitting behavior of the emitting devices is evaluated for the determination of the fill level.

The emitting behavior thereby relates, in one design, to whether a resonance condition has changed for at least one emitting device or whether it has remained the same.

For example, depending on the design, the resonance frequency, the impedance, or reflection signals possibly occurring as a result of the supply with electromagnetic signals are determined or evaluated for assessing the emitting behavior.

If the emitting behavior changes, which is identified, e.g., by a change of the resonance frequency, then it is assumed that either the medium in front of the emitting device has changed or that the medium has reached a fill level that is linked to the emitting device. Thereby, the reaching of a fill level quasi also represents a change of the medium covering the emitting device, insofar as—for example, when used as overflow protection—the ambient or process air located in front of the emitting device is replaced by the medium to be monitored.

The emitting devices are, in one variation, designed and arranged so that they—when reaching a certain fill level— are in contact with the medium.

Due to the—direct or indirect—contact between emitting device and medium, in particular the emitting behavior of the emitting devices changes so that it can be assumed from the identification of the changed emitting behavior that the assigned fill level has been reached.

The use of several emitting devices has, in particular, the advantage that several fill levels can be identified and/or that at least one fill level can be redundantly monitored.

Thus, in one design, the behavior of at least a few emitting devices are separately evaluated.

In one design, all present emitting devices are separately evaluated in respect to their respective emitting behavior.

The individual data or results for the individual emitting devices as partial information are subsequently consolidated into an overall statement.

For this, the emitting devices are summarized into groups in one design, which are each evaluated or monitored in combination.

Plausibility considerations are incorporated in one design.

The individual results for the self-monitoring of emitting devices are used in a further design.

The emitting devices are arranged, at least in part, at different levels along a longitudinal axis of the container, in one design.

This arrangement is generated, in one design, by selective positioning of the emitting devices at predetermined levels or with predetermined level differences.

In a further design, the different arrangements result randomly due to assembly, in that, e.g., a support element with the emitting devices is mounted in the container.

Assembly occurs, in one design, at least in part, in one step, in which a support element is screwed into a wall of the container.

Because the object is the detection of fill levels, the emitting devices are preferably designed and arranged in relation to the container containing the medium so that they can interact with the medium on the side of the container.

In one design, at least a portion of the emitting devices is supplied with a mono-frequency signal.

In one design, the emitting devices are supplied with the same signal either simultaneously or time delayed.

Thereby, in one design, the frequency of the signal is the same as the resonance frequency when there is no medium or, in particular only ambient air located in front of the emitting device that is supplied with the electromagnetic signals for determining the emitting behavior. Thus, if the resonance frequency changes, this means that the medium is located in front of the respective emitting device. In this case, the reaching of a fill level is identified so that, in particular, this is the implementation of overflow protection.

In an alternative design, the frequency of the electromagnetic signals corresponds to the resonance frequency in the presence of medium coverage. Thus, if, as a result of emitting devices being supplied with such signals, the frequency is no longer fitting, it can be assumed that the medium has fallen below the assigned fill level, provided that the medium itself does not change in respect to its characteristics relevant for measurement.

In one design, signals with different frequencies are used—in particular with different resonance frequencies—in order to determine or monitor the emitting behavior of the emitting devices concerned in a measurement, i.e., when the emitting devices are supplied with electromagnetic signals.

A portion of the emitting devices thus identifies, for example, the transition from a free to a covered state, while another portion of the emitting devices simultaneously monitors the transition from a covered state to one free of medium.

In one design, a portion of the emitting devices is supplied with electromagnetic signals and signals are tapped by a further portion of the emitting devices. The tapped signals thereby result, in one design, from a direct coupling between the emitting devices and, in an additional or alternative design, result from a coupling via the medium.

In the designs above, signals are respectively used with a special frequency that allows for the identification of whether a change has occurred or not, i.e., whether the signals and frequency still fit or not.

In the following design, this yes/no statement is expanded onto a more comprehensive measurement of the emitting behavior of at least one emitting device. This allows for more information to be obtained via the medium or via the emitting devices.

It is thus provided in one design that at least a portion of the emitting devices is supplied with several electromagnetic signals having frequencies within a predeterminable frequency band.

The designation portion of the emitting devices relates, depending on the design, to at least one emitting device and at most to all present emitting devices.

In one design, in particular, a frequency sweep is carried out in order to measure the resonance behavior of at last one emitting device and, preferably, also to determine the current resonance frequency assigned to the emitting device.

In one design, the permittivity of the medium covering the emitting device is deduced based on the determined resonance frequency.

This evaluation is based on the emitting behavior of the emitting devices being dependent on the material characteristics of the surrounding substances.

In particular, if the emitting device is understood as an antenna, then its emitting behavior is dependent on the material characteristics of the medium into which the electromagnetic signals are emitted. Thus, if there is a known correlation between the emitting behavior and the relevant material characteristic—in this case, permittivity—, then the material characteristic can be deduced from a measure determined for the emitting behavior.

At least one measure for impedance matching is determined in one design by evaluating the emitting behavior—of at least one emitting device.

At least one measure for impedance matching is determined in one design by evaluating the emitting behavior of several emitting devices.

The emitting devices are understood, for this, to be such that they each match one wave impedance of a line that carries the electromagnetic signal to the wave impedance that is given in the area in front of each emitting device and thus is also dependent on whether medium is present or, respectively which medium is present. Thus, a measure for the impedance matching is determined for fill level monitoring.

A temporal behavior of the measure for impedance matching is determined and evaluated in one design.

In the above mentioned design, thus, the temporal development of the emitting behavior of at least one emitting device is utilized. Hereby, for example, changes in the medium or changes in the emitting device can be identified.

If several emitting devices are present, then these are located at different levels in respect to the fill level and the behavior of the emitting devices is separately evaluated. Thus, it is possible to identify not only the reaching of a fill level, but also even that the medium approaches this fill level.

Such information can be separately issued or can be used purely internally for a plausibility check as part of the evaluation.

In the following designs, an approximation function is implemented that allows for the detection of the medium approaching the fill level before the actual reaching of the fill level is signaled.

A limit level switch generally signals one of the two states: "free" or "covered".

In the case of an approximation function, this is expanded, in one design, to the states resulting, e.g., "free", "approaching", "covered" and "exceeded".

These states can correspondingly be transferred on established output signals such as e.g., 4 . . . 20 mA signals or control voltages.

It is advantageous for the designs when the emitting devices are decoupled from one another or when they are operated so that a coupling is essentially avoided.

Thus, in one design, it is detected that the medium is approaching a predeterminable fill level using the emitting behavior of at least two emitting device, in that the measure for impedance matching is determined for the at least two emitting devices and in that the determined measure is evaluated in dependence on the point in time of the respective change.

If, for example, overflow protection is implemented, then is can be assumed that first a lower fill level is reached before a higher fill level is reached, insofar as the two emitting devices are assigned different fill levels. This means that, first, the lower emitting device indicates the reaching of its associated fill level and that, then, the upper emitting device exhibits emitting behavior that corresponds to being covered by medium.

Alternatively, and without taking points of time into consideration, it is only evaluated whether both emitting device display the reaching of the respectively associated fill level.

The temporal evaluation is, however, particularly advantageous for calibration in order to allow a reliable identification of the fill level without the fixed specification of an orientation of the emitting devices in relation to the container.

Furthermore, in one design, the temporal evaluation allows for information about the speed at which the fill level changes.

It is provided in one design that the emitting behavior of at least two emitting devices is evaluated in the sense of redundancy.

In one design, thereby, the emitting behavior of the at least two emitting devices are evaluated in view of a common fill level and/or a common fill level range.

For the above design, preferably, those emitting devices from the present emitting devices are chosen or grouped in respect to evaluation, in which the medium causes a change in the emitting behavior when the same fill level or a same fill level range is reached.

In one design, at least two emitting devices are evaluated together, e.g., at least in part, the same components or switch elements are used.

In an alternative design, the emitting behavior of the emitting devices is separately detected and evaluation data is summarized or synchronized.

The evaluation of data from the emitting devices as fusion of the individual measurements possible with the emitting devices is dependent on whether the emitting devices relate to the same or different fill levels of the medium.

The arrangement between emitting device and fill level is thereby independent of the arrangement of the emitting devices—e.g., on one support element—relative to one another and is dependent on the type of attachment of the emitting devices in relation to or in the container, in which the medium is located.

In order for the assembly of the emitting devices in the container to enable a greater amount of freedom and independence, it is provided in one design that there is no fixed configuration for which emitting device, either together or separately, the emitting behavior is evaluated.

This means that only after the attachment of the emitting devices is it determined by which emitting devices the emitting behavior is evaluated, either together or separately. Thus, only after assembly is it determined which emitting devices relate to different fill levels or fill level ranges and which relate to same fill levels or fill level ranges.

A fixed specification would mean that the emitting devices have to be attached in the container according to a specification. This is avoided or not necessary due to the above mentioned design.

Calibration of the mounted measuring arrangement is advantageous for the flexibility of assembly, which is designed, for example, like the following variations.

In one design, calibration is carried out in that a temporal sequence of a change in the emitting behavior is determined for individual emitting devices.

Preferably, the calibration is not carried out for a selected change of the fill level of the medium, but rather results from the change of the fill level of the medium related to the process. The measuring device is thus attached at the measuring site and immediately put into operation, wherein calibration for future use results from the first determination of the fill level. Calibration includes, in particular, the assignment of the emitting devices to a respective fill level.

If, for example, the reaching of a fill level is used for overflow protection, then, based on the temporal sequences of the changes in the respective emitting behaviors or based on a simultaneity of the changes, it is concluded how the respective assigned fill levels are arranged to one another or how they coincide.

Preferably, this occurs during the normal and process-dependent reaching of the respective fill level.

In one design, a "configuration mode" is started after mounting a measuring device for implementing the method and preferably before a first filling event, in that the emitting devices are individually operated and, in particular, the respectively occurring measuring results are separately processed.

In one design, a central emitting device is present, wherein the measuring results of the other emitting devices are evaluated in respect to the central emitting device.

In one design, the remaining emitting devices are symmetrically arranged around the central emitting device. This allows for the alignment of the fill level sensor to be more precisely determined.

In one design, the other emitting devices are grouped into groups and fill levels above and below the central emitting device are assigned based on the signaling of the central emitting device being covered.

Additionally, in a further design, a logical link within the group is carried out for redundancy configuration.

In a design without a central emitting device, grouping is carried out when half of the emitting devices signal coverage.

Additionally or alternatively, the evaluation of the emitting behavior or the further processing of the correspondingly determined value or measure numbers for at least a portion of the emitting devices are taught in a learning mode.

In the learning mode, the respective emitting behavior of the considered portion of the emitting devices is separately evaluated. Then, based on the emitting behavior of at least one chosen emitting device, an evaluation of the emitting behavior of the other emitting devices is carried out.

If, due to the arrangement of the emitting devices to one another and as a result of assembly, it is known that three different fill levels can be monitored, then the emitting behavior of the emitting device that is assigned the middle fill level is particularly evaluated, insofar as a middle is defined by this emitting device.

If idle state protection is constituted by the device or the method, then it can be assumed that after assembly of the emitting devices, or the support element, or the device for creating a measuring arrangement with the container and the device, the medium is filled into the container and also exceeds the emitting devices. Calibration can thus be carried out during this first filling, wherein, however, the evaluation or assessment of the individual results for the running measuring operation is different than the overflow protection mode.

The following designs relate to the assembly of emitting devices. Thereby, the orientation of the emitting devices results randomly or, in one design, is deliberately implemented.

In one design, the emitting devices are attached in the container in relation to one another so that at least two emitting devices are each assigned different fill levels of the medium.

The assignment of fill level to emitting device thereby results in that the medium causes a change in the emitting behavior of the emitting device assigned the fill level when reaching the respective fill level.

In this design, the mounted emitting devices are located at different levels of the container so that they each monitor different fill levels or make the reaching of these fill levels able to be signalized.

In one design, the monitoring of several fill levels is expanded in that the emitting devices are attached in relation to the container so that at least three emitting devices are each assigned different fill levels of the medium.

Here, the mentioned assignment is also given in that the medium causes a change in the emitting behavior of the emitting device assigned the fill level when reaching the respective fill level.

The middle fill level is, in one design, defined as the actual fill level to be monitored and undergoes a special evaluation.

The reaching of the fill level above or below the middle fill level then means that the medium is approaching the relevant fill level or that the relevant fill level has already been exceeded in overflow protection or fallen below in idle state protection. Thus, in this design, a sort of advance warning and an ultimate overflow or idle state signalization are possible.

In an additional or alternative design, the emitting devices are attached in relation to the container so that at least two emitting devices are each assigned an essentially same fill level or same fill level range of the medium.

For the lot of emitting devices, in this design, a positioning results in which at least two of the present emitting devices relate to the same fill level or the same fill level range.

The magnitude or extent of the fill level range can thereby be suitably defined by the user, e.g., depending on the desired resolution of fill level detection.

The assignment of fill level or fill level range to emitting device is also given here in that the medium causes a change of the emitting behavior of the at least two emitting devices assigned the fill level or fill level range when reaching the fill level or fill level range.

Whether the same fill level is monitored—in the scope of a predetermined tolerance—depends on the geometry of the emitting devices and also on the orientation of the emitting devices in relation to the longitudinal axis of the container that runs along the fill level.

Whether a range is monitored, is additionally dependent on the specification of the local resolution to possibly be set by the user.

If several emitting devices relate to the same fill level or to the same fill level range, then redundancy is given. This can be used for the reliability of the signal for reaching the fill level or this can be used for identifying, e.g., an aging process or error in the individual emitting devices.

An advantage of redundancy is always that, even when an emitting device fails, measurement with the remaining emitting devices of the same group is further reliably possible.

The following additional or alternative designs relate to monitoring.

It is thereby provided that information about the state of the emitting device is detected from a temporal change of the emitting behavior of at least one emitting device.

Using the temporal development of the emitting behavior, e.g., with a gradual change in the resonance frequency or with a broadening of the resonance curve, etc., it can be identified how the emitting device develops e.g., as a result of aging or what happens to the emitting device e.g., as a result of sedimentation.

In a design associated therewith, the determined information is used for determining the fill level of the medium.

A corresponding recalibration takes place in one design based on the development of the emitting device.

Such a recalibration is carried out, for example, in one design as follows:

A sedimentation of the medium on an emitting device possibly only leads to a shift of the resonance frequency of the concerned emitting device and does not prevent the detection of the change between the free and covered states. However, the concept leads to the frequency having to be tracked, relative to which a change is coverage is identified.

This tracking is carried out in that the measuring results within a group of emitting devices that relate to a same fill level or fill level range are compared to one another and that an adaptation during processing of the emitting device is carried out, wherein the result of which does not correspond to the other results.

In one design, an emitting device is no longer used for measurement based on the determined state of the emitting device.

The information about the state of the emitting device relates to a degree of contamination or aging of the considered emitting device, in one design.

In the following designs, in addition to the detection of the fill level with the emitting devices, at least one characteristic of the medium is detected in addition to the fill level.

Thus, it is provided in one design that the emitting behavior of at least one emitting device is evaluated in view of at least one characteristic of the medium.

In one variation for the above design, reference is made to the emitting behavior of the emitting devices depending on which permittivity the medium covering the considered emitting device exhibits.

Thus, if the fill level doesn't change, but the emitting behavior does change, then a change in the permittivity can be deduced.

Alternatively, in a known correlation, e.g., using correspondingly stored data or functions, a value for the permittivity is determined from the determined resonance frequency.

That the fill level has not changed, can e.g., be determined in that the emitting behavior of the emitting devices assigned other fill levels or the same fill level is evaluated.

Thus, in one design, information about the permittivity of the medium is determined based on a resonance frequency of at least one emitting device.

A particular use, in which the invention can be implemented very well, consists of the Medium consisting of not only one substance.

If different substances that don't mix are located in one container, a separating layer is the usual result.

If the substances that together form the medium in the container differ, then in one design, the presence of a separating layer is identified and data is determined for the separating layer.

In one design, different emitting devices obtain information about the presence of a separating layer in the medium due to the presence of different resonance frequencies.

Thus, if the result for several emitting devices is that the medium covers each of the emitting devices, then the resonance frequencies—as characteristic for emitting behavior—are so different that the permittivities of the substances covering the emitting devices differ and it can be concluded that a separating layer is present or that at least two different substances or phases are present.

In respect to the separating layer, the level of the separating layer is determined in the following design. For this, at least the following steps are provided:

Based on the emitting behavior of at least two emitting devices, to which different fill levels are assigned, the reaching of the fill level by the medium—of several substances or phases or general states e.g., liquid and foam—is determined.

Then, a first duration between the reaching the respective fill levels is determined, i.e., the duration between the points in time at which the fill level is reached. A filling speed is determined from the first duration and a known fill level distance—i.e., different in height—between two fill levels assigned to two emitting devices.

Finally, a second duration for one of the two emitting devices is determined that lies between the reaching of the fill level assigned to the emitting device and a change in the resonance frequency of the emitting device.

If the emitting device is covered by the medium for the first time, then the medium with the upper substance of the two substances reaches the associated fill level. If the resonance frequency changes, this means that the emitting device is covered by the next substance. Thus, the second duration indicates how long the upper substance has moved over the emitting device.

Thus, the invention also relates to a device with a signal conductor arrangement for identifying a separating layer or for detecting data about a separating layer.

In detail there is a plurality of possibilities for designing and further developing the invention as will become apparent from the following description of embodiments in conjunction with the accompanying drawings.

DETAILED DESCRIPTION OF THE INVENTION

Figure 1:
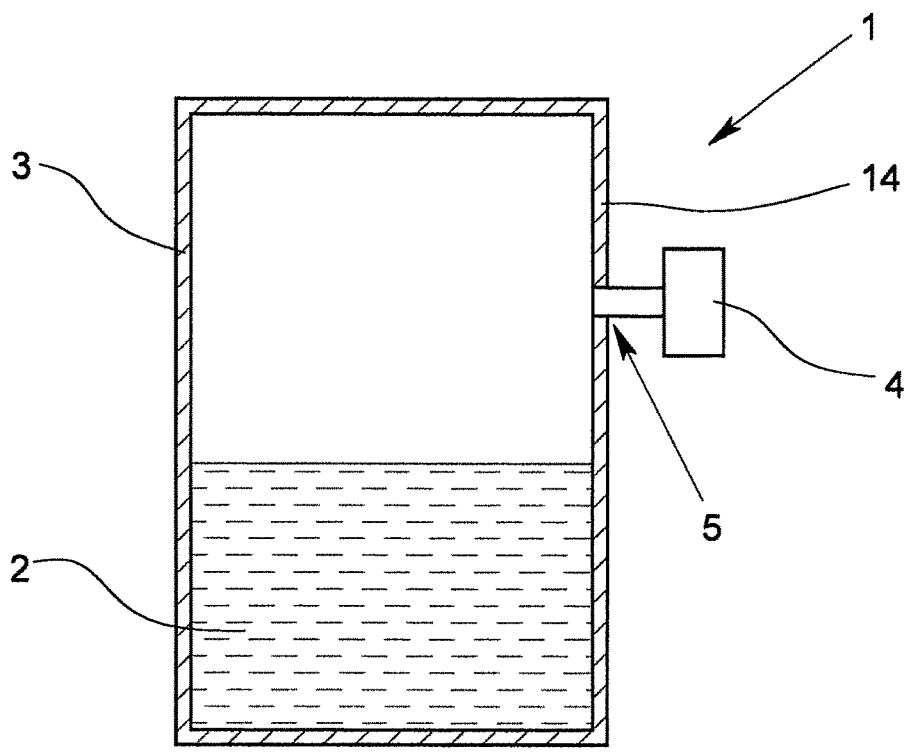
FIG. 1 is a schematic representation of a part of a processing system

It is schematically represented in FIG. 1 how the fill level of a medium 2 in a container 3 is monitored by a The device according to the invention in a processing system.

The device 1 is used here, in particular, as overflow protection. Accordingly, the device 1 can, however, also be used here as idle state protection—not shown here.

The device 1 in the shown schematic design has an electronic device 4 and a signal conductor arrangement 5. The electronic device 4 generates electromagnetic signals—preferably via a signal source, not shown here—that are supplied to the signal conductor arrangement 5.

After supplying the signals, the electronics unit 4 evaluates the behavior of the signal conductor arrangement 5 or, respectively, the individual components to be described in the following in terms of whether or not the medium 2 is in contact with the signal conductor arrangement 5.

In the case of overflow protection, the change from uncovered to covered state is detected. Conversely, in the case of idle state protection—not shown here—, it is signalized when the signal conductor arrangement 5 is free of medium.

The dependence of the resonance behavior—and in particular, the resonance frequency—of the signal conductor arrangement 5 or its components on the surroundings of the signal conductor arrangement 5 is utilized when measuring or monitoring the fill level.

In particular, that the resonance behavior is dependent on whether the presence of coverage is from a medium 2 or from ambient air is utilized.

The signal conductor arrangement 5 extends into the wall 14 of the container 3 and is thus a part of the side wall. For this, the wall 14 has a recess that is sealingly closed again by the signal conductor arrangement 5.

Figure 2:
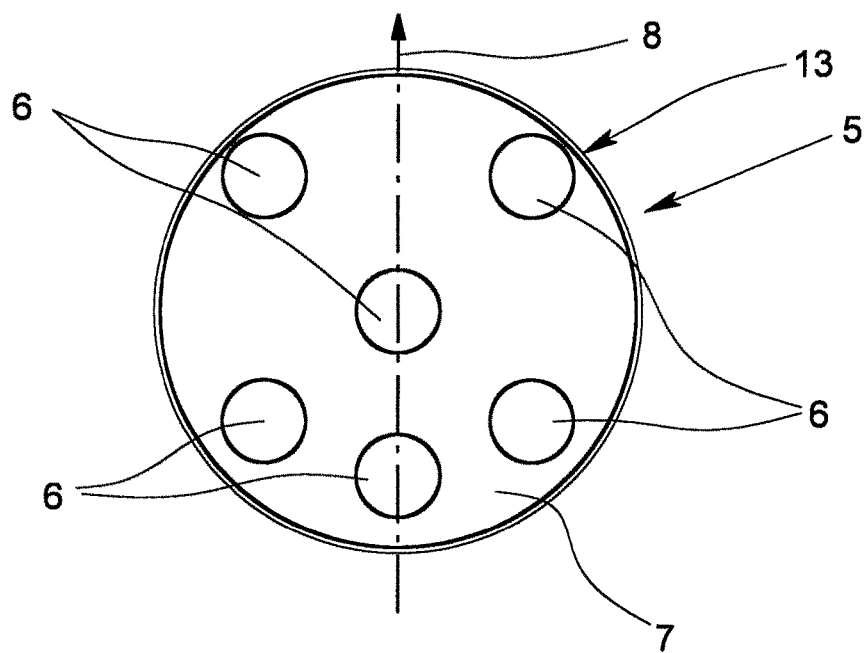
FIG. 2 is a top view of a part of a schematically represented signal conductor arrangement of a device for fill level measurement in a first design.

FIG. 2 shows a top view of the signal conductor arrangement 5 and its overall six emitting devices 6.

The emitting devices 6 are arranged in a common support element 7. Thereby, this is a ceramic substrate, in or onto which the emitting devices 6 are created. The support element 7, here, is disk-shaped having a circular circumference.

The emitting devices 6 are designed circularly in the shown embodiment and are located along a longitudinal axis 8 at three different levels.

In alternative embodiments—not shown here—not all emitting devices have the same shape or the emitting devices are, e.g., oval or rectangular.

The emitting devices are arranged mirror symmetrically to the longitudinal axis 8 in the shown embodiment and can be separated, here, into three groups at three different levels.

Three emitting devices 6 here shown at the bottom are thereby at levels slightly staggered relative to one another and together monitor a broader strip of the fill level—in the mounted state and under the condition that the longitudinal axis of the support element and the longitudinal axis of the container essentially coincide.

The two outer of the three lower emitting devices 6 are, in turn, located at the same level, so that a redundancy also results especially for monitoring the assigned fill level within this strip.

In the next level, an individual emitting device 6—arranged in the middle here—borders thereon, to which two emitting devices 6 connect.

The two upper emitting devices 6 provide redundancy for the assigned fill level, since they are both located at the same level.

Overall, three different fill levels or fill level ranges to be monitored by the individual emitting devices 6 are obtained. Plausibility considerations can be made using the measuring results at the different levels in order to increase the reliability of fill level determination or monitoring.

The resolution, with which the reaching or falling below of a fill level can be detected, is increased with the number of different levels of the emitting devices—depending on use and evaluation.

For insertion, an outer thread 13 is provided on the outer surface of the circular support element 7. Accordingly, the wall, into which the device 1 is to be mounted, has an inner thread so that the support element 7 can be screwed into the wall and closes it again.

Different end positions of the emitting devices 6 of the signal conductor arrangement 5 result from screwing as means of attachment.

In order to be able to react to this diversity of orientations in relation to each fill level to be monitored due to mounting, the type of evaluation of the emitting devices 6 is not rigidly specified, rather the evaluation or interpretation of the measuring results of the individual emitting devices 6 are each adapted to the use or to the end position.

Figure 3:
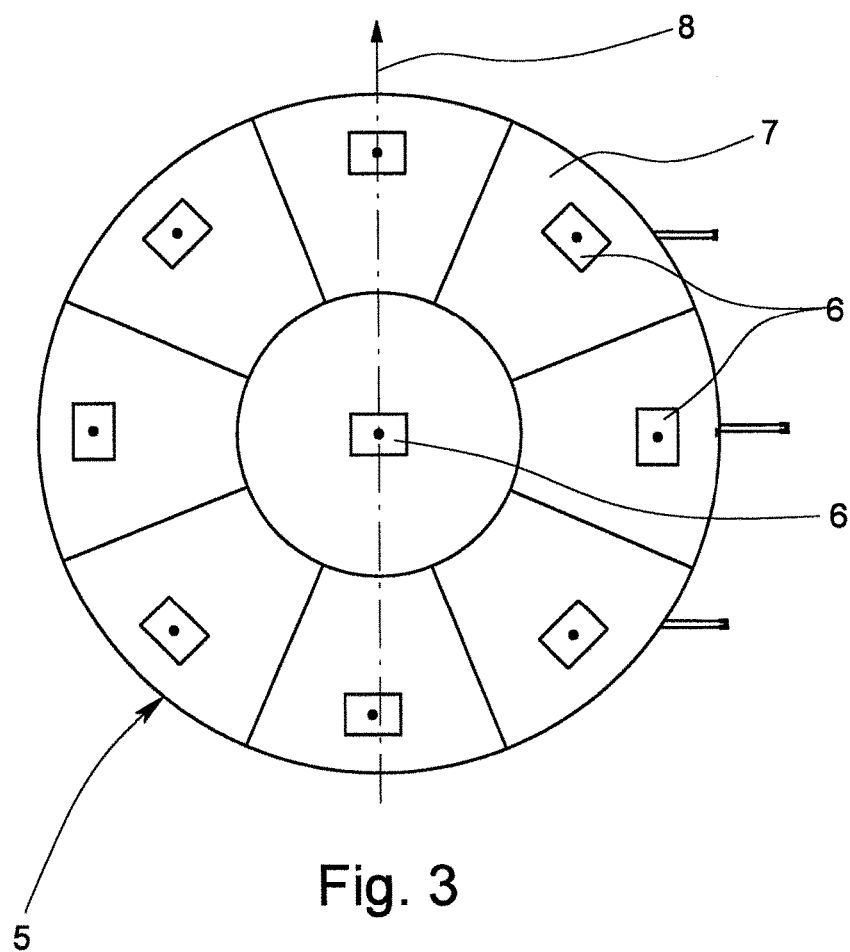
FIG. 3 is a top view of a signal conductor arrangement in a second design.

A further design of the emitting devices 6 on the support element 7 is shown in FIG. 3.

In the illustrated exemplary embodiment, eight emitting devices 6 are rotation-symmetrically arranged around one, single emitting device 6 located in the center.

It can be seen that this number and distribution of emitting devices 6 allows an arbitrary number—created by turning—of end positions of the support element 7, which are each used for monitoring the same or very similar fill levels.

Thereby, depending on the measuring accuracy that can be implemented with the emitting devices 6, significantly more differing levels can possibly also be defined—here, along the longitudinal axis 8 of the support element 7. In the case of greater spread or lower resolution, the measuring sections can also coincide.

Metal strips are provided between the emitting devices 6 that cause a decoupling of the individual emitting devices 6.

Additionally, three lines for electronic connection are provided behind the support element 7.

Figure 4:
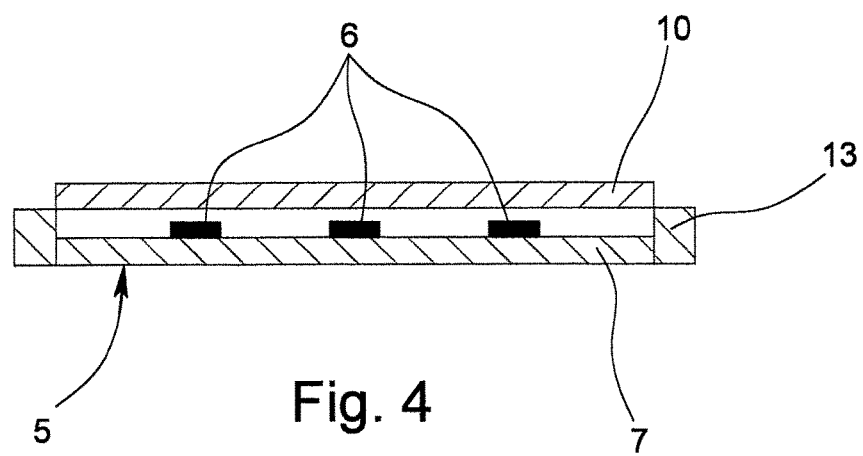
FIG. 4 is a cross section through a schematic design of a signal conductor arrangement in a third variation.

A third variation of the signal conductor arrangement 5 is seen in FIG. 4.

It can be seen in the cross section that the support element 7 is a multi-layer ceramic being striped in the one case and empty in another, for clarity having, here, three emitting devices 6 inserted between its layers.

The emitting devices 6 are thereby protected against medium—not shown here—by the support element 7, itself, and also by the protective layer 10.

In the shown embodiment, the support element 7 is surrounded by a structure on the side that also bears the outer threading 13 for screwing and attaching into the recess—not shown here—in the wall of the container.

Figure 5:
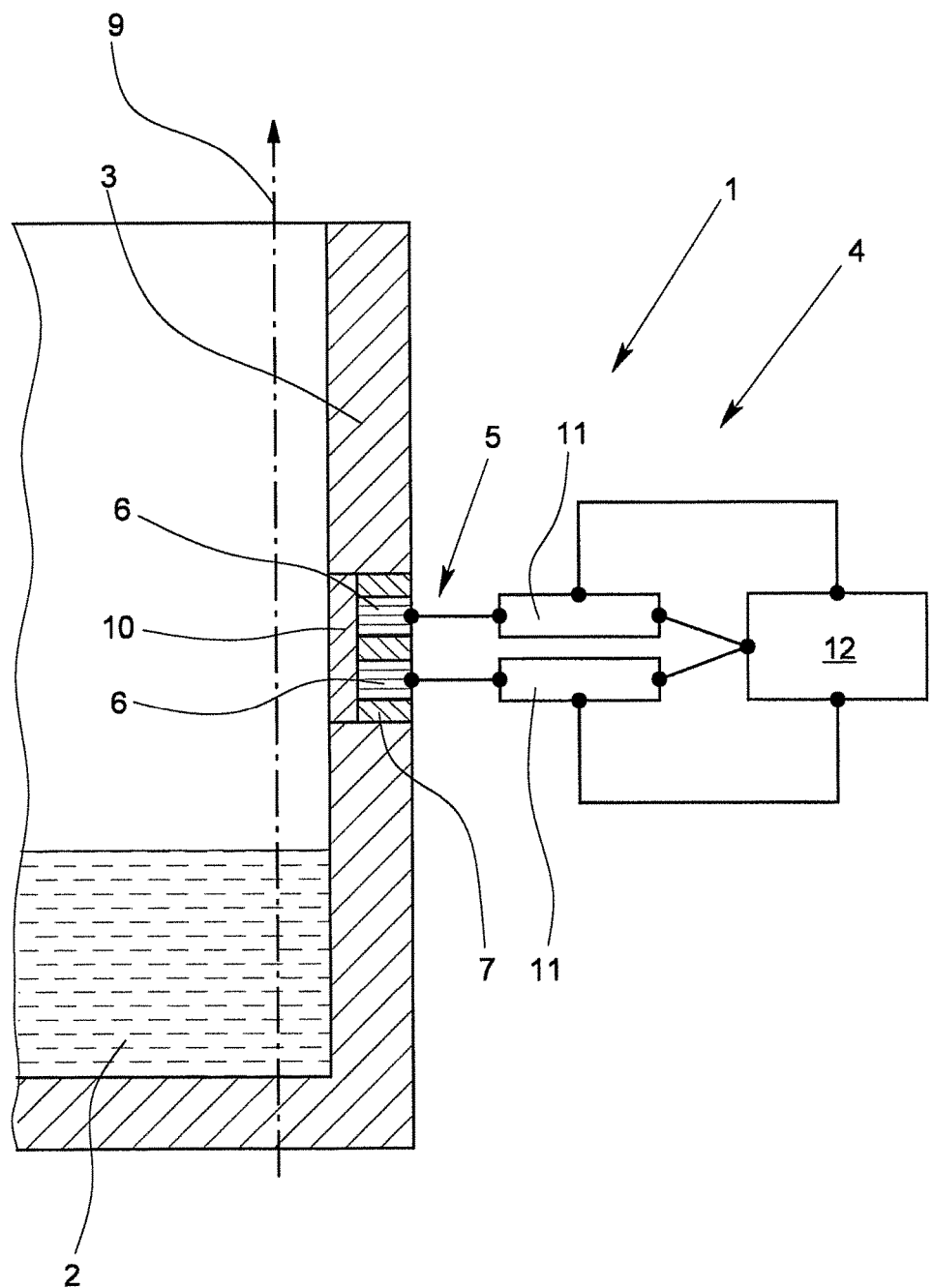
FIG. 5 is a schematic cross section through the device for fill level determination in use in a processing system.

It can be seen in FIG. 5 that two emitting devices 6 as parts of the signal conductor arrangement 5 of the device 1 are arranged within the support element 7 at different levels along the longitudinal axis 9 of the container 3. The container 3 thereby has a corresponding recess that receives the support element 7.

The emitting devices 6 are protected by a dielectric protective layer 10 facing the medium 2, which here are mounted flush with the inner side of the container 3 that contains the medium 2.

The electronic device 4 has a measuring device 12 and two reflector switches 11 that are each assigned to an emitting device 6.

The measuring device 12 generates electromagnetic signals that are given to the emitting devices 6 via the two reflector switches 11.

The reflector switches 11 receive a reflection signal as response signal from their respective emitting devices 6, from which a measure for the resonance conditions of each emitting device 6 results.

This information of the reflector switches 11 is transmitted to the measuring device 12 for further processing. The reflector switches 11 thus represent a sort of preprocessing in the shown design.

Based on the data of the reflector switches 11 it is determined in the measuring device 12 whether the medium 2 covers one of the emitting devices 6.

Then, the reliability of the individual measurement is examined based on the data of all emitting devices 6.

Finally, the measuring device 12 generates at least one switch signal that, here, represents the reaching of a fill level.

Additionally or alternatively, the falling below of a fill level is signalized or, respectively, information about the rising or falling of the fill level is issued. This is possible in that the emitting devices 6 are located at different levels along the longitudinal axis 9 of the container 3, so that at least two fill levels can be monitored.

Exemplary embodiments of components of the electronic device 4 for implementing measurement or monitoring of the fill level are shown in the illustrations in FIGS. 6-9.

Thereby, only one emitting device 6 that is additionally designed as an antenna is shown in each. The shown embodiments are thus possibly to be combined with several emitting devices 6 or each emitting device 6 has one of its own of the shown electronic switches.

Figure 6:
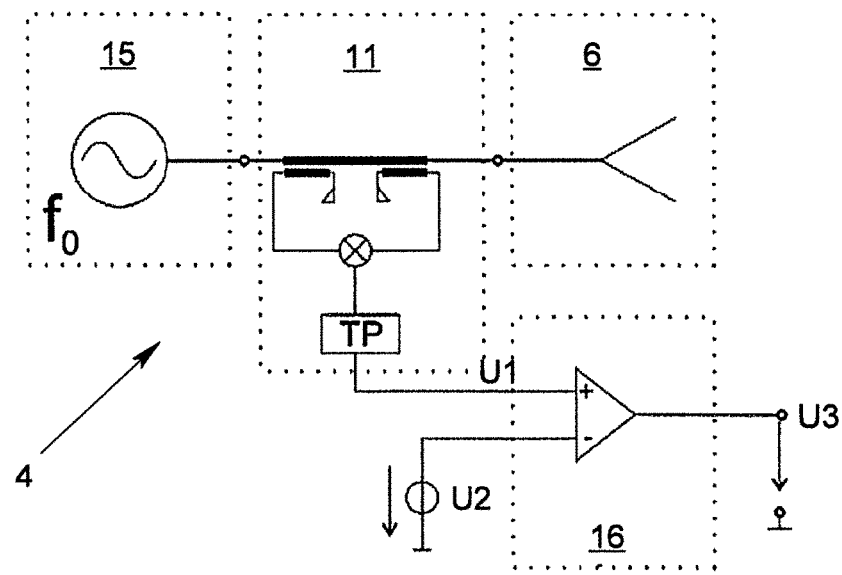
FIG. 6 is a schematic representation of a first design of a part of an electronics unit.

Narrow band scalar measurement is implemented as an example in FIG. 6.

The emitting device 6 is continuously supplied with a mono-frequency signal during narrow band scalar measurement.

The supply frequency $f_0$, i.e., the frequency of the electromagnetic signal, is chosen in one embodiment so that it corresponds to the resonance frequency of the emitting device 6 in the case that only air and, in particular, no medium to be detected is located in front of emitting device 6.

Thus, if the emitting device 6 is supplied with the signals and no medium is located in front of the emitting device 6, then the emitting device 6 emits the electromagnetic signals.

With the aid of the reflector switch 11, the adaptation of the emitting device 6 at the supply frequency $f_0$ is permanently monitored.

The signal generator 15 permanently supplies the emitting device 6 with the signal of the frequency $f_0$.

The reflector switch 11 issues a DC voltage that depends on the ratio between the power of the signals of the signal generator 15 and the power reflected at the emitting device 6.

Additionally, a low-pass is provided in the reflector switch 11, here.

In a downstream comparator 16, the DC voltage U1 is compared to an externally applied reference voltage U2 and evaluated with it.

If air is located in front of the emitting device 6, then the emitting device 6 is adapted and its input reflection is small. The reflectometer voltage U1 is, in this case, less than the reference voltage U2, so that the comparator 16 issues a low level as voltage U3.

If a medium that is not air is located in front of the emitting device 6, the resonance frequency of the emitting device 6 is shifted and differs, in particular, from the frequency $f_0$ of the electromagnetic signals. The emitting device 6 thus has a bad adapting behavior at the applied frequency $f_0$.

Hereby, a higher input reflection of the emitting device 6 results, so that the DC voltage U1 of the reflector switch 11 also increases.

If the reflector voltage U1 is greater than the reference voltage U2, then the comparator 16, which is comprised essentially of a differential amplifier here, generates a high level that signalizes the reaching of the fill level associated with the emitting device 6.

This means that the downstream evaluation unit—not shown here—only evaluates the voltage U3 or needs to identify the possibly occurring change in voltage in order to evaluate the emitting behavior of the emitting device 6 for the use as level limit switch.

Figure 7:
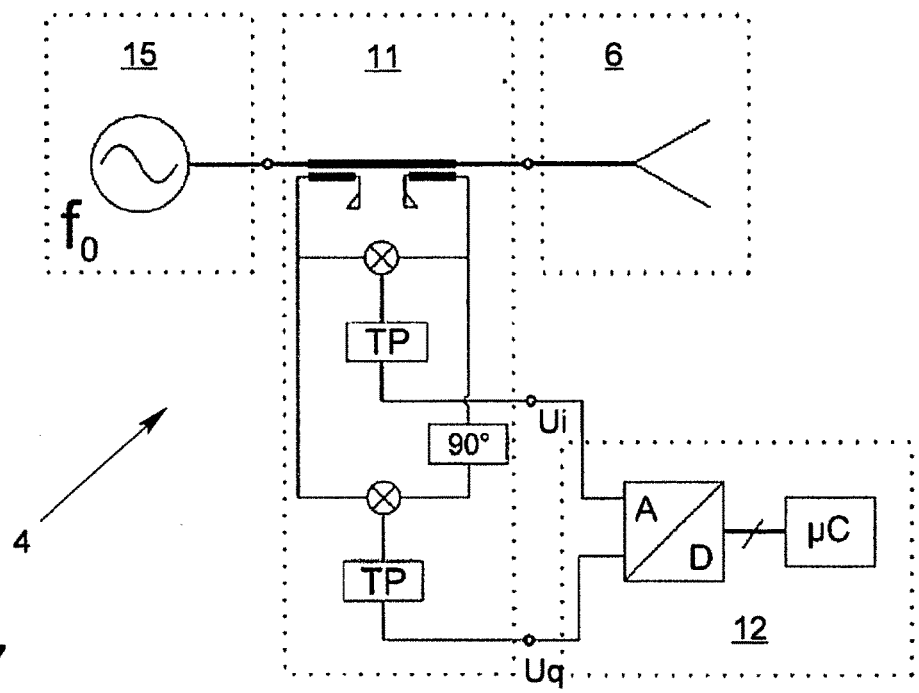
FIG. 7 is a schematic representation of a second design of a part of an electronics unit.

FIG. 7 shows an arrangement for implementing a narrow band phasor measurement.

This embodiment is advantageous, in particular, when the emitting device 6 is covered with a protective layer—not shown here—or when the medium to be detected has a very low permittivity.

For this, the narrow band scalar measurement shown in FIG. 6 is expanded by a further measuring point to a complex measuring reflector switch—or a so-called IQ reflectometer.

The essential change as opposed to the embodiment of FIG. 6, is experienced by the reflector switch 11.

Both the signal generated by the signal generator 15 as well as the reflection signal coming from the emitting device 6 are separated and supplied to a second measuring site for the second measuring site.

In one of the two signal paths, there is a 90° phase shifter.

The first, unchanged measuring site delivers the "in-phase" signal Ui and the second measuring site connected to the phase shifter delivers the "quadrature" signal Uq.

Both signals Ui and Uq are digitized in the measuring device 12 and are further processed in a microprocessor in the shown embodiment.

With the aid of the implemented IQ measuring site, a phase evaluation of the reflected signal can be carried out. It is thereby advantageous that the phase shift that is created by the reflection on the fill level is a very sensitive measure.

Figure 8:
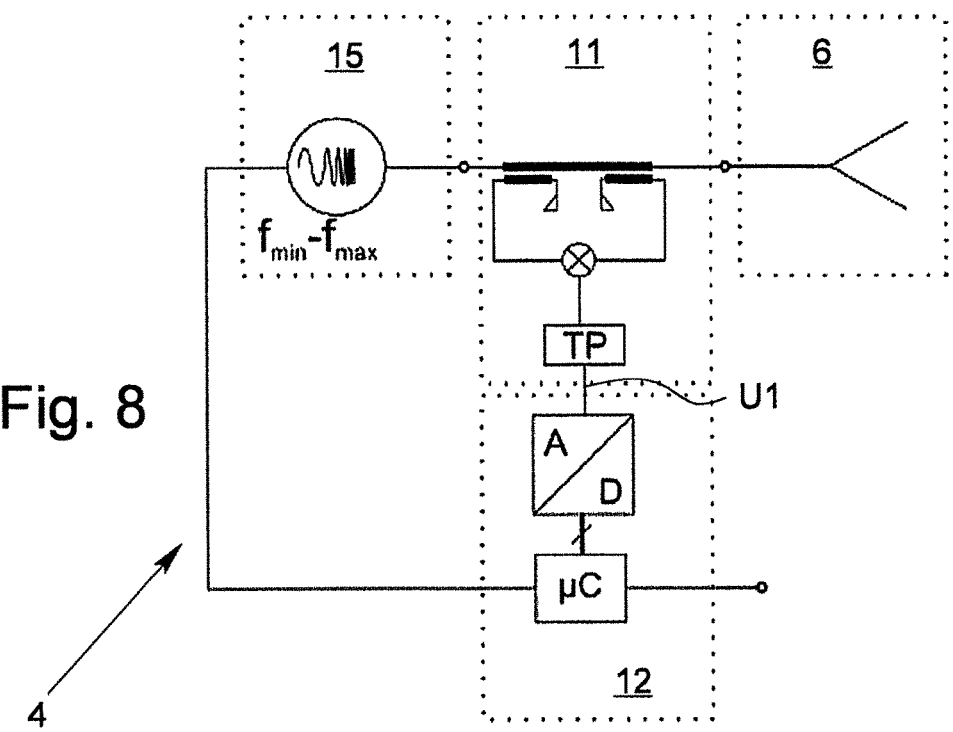
FIG. 8 is a schematic representation of a third design of a part of an electronics unit.

FIG. 8 deals with a broadband scalar measurement.

In the case that the medium to be detected has high losses, the adaptation curve of the emitting device is broadened over the frequency.

This can have the result that when the emitting device 6 is covered by the medium, no sufficient reflection can be detected.

For this, a broadband adaptation curve of the emitting device 6 is recorded with the shown embodiment.

The signal generator 15 generates electromagnetic signals for this having different frequencies between two limiting frequencies $f_{min}$ and $f_{max}$.

This occurs, for example, using a PLL phase locked loop operated VCO voltage controlled oscillator. Alternatively, a direct digital synthesis DSS is implemented.

The frequency of the signals is set by a microprocessor in the shown example, which is a part of the measuring device 12 here.

The reflectometer voltage U1 is directly digitized via a analog-digital converter in the shown and exemplary embodiment, so that the respective reflection value of the set frequency of the electromagnetic signals of the signal generator 15 can be assigned.

After a complete frequency sweep, the adaptation curve is evaluated in the measuring device 12, wherein the lowest reflectometer voltage U1 determines the resonance frequency of the emitting device 6.

If the resonance frequency deviates from the frequency that is assigned to the non-covered state, then the reaching of the fill level assigned to the emitting device 6 is signalized.

Figure 9:
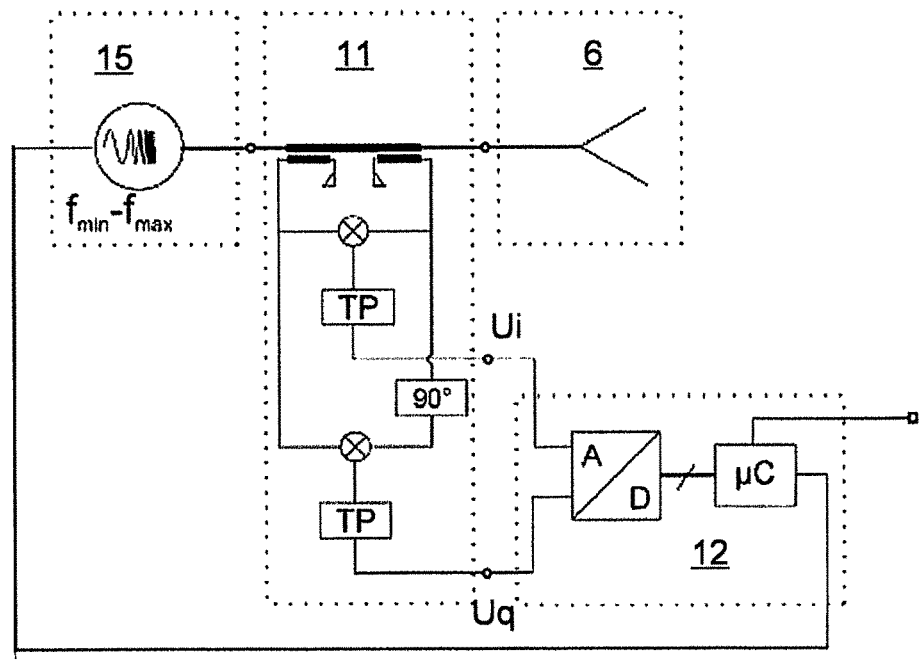
FIG. 9 is a schematic representation of a fourth design of a part of an electronics unit.

A broadband phasor measurement can be seen in FIG. 9.

The reflector switch 11 is unchanged to that of the embodiment in FIG. 6 and also generates an "in-phase" signal Ui and a "quadrature" signal Uq.

The signal generator 15 is designed identical to the one in FIG. 8. The electromagnetic signals thus also have different frequencies, wherein the control of the frequency also occurs here with a microprocessor as part of the measuring device 12.

This switch is, in particular, advantageous for the case that a thin protection layer is located in front of the emitting device 6 and, insofar as the influence of the medium on the reflection characteristic is potentially reduced by the protective layer.

The switch is even more advantageous when the medium is additionally strongly lossy. Thus, the combination of phasor evaluation and broadband detection particularly lends itself to this case.

Figure 10:
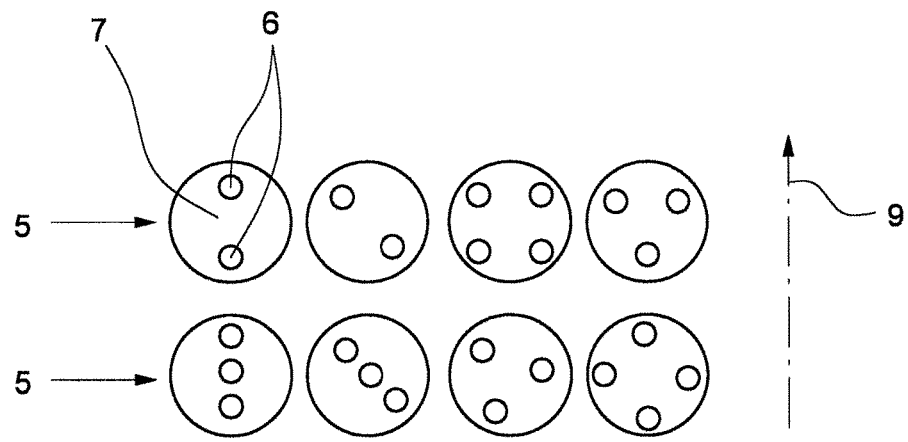
FIG. 10 is eight top views of different signal conductor arrangements.

Eight different top views of the side of the signal conductor arrangement 5 which will face the medium in the device according to the invention are shown in FIG. 10.

The longitudinal axis 9 of the container—not shown here—into which the device is inserted is depicted so that it can be identified that the medium will increase from bottom to top.

Embodiments or orientations in relation to the longitudinal axis 9 are located in the upper of the two shown rows, which allow for the detection of two different fill levels. the four embodiments in the lower row allow for the monitoring of three fill levels.

It can be seen that there are four different arrangements of the emitting device 6 on the support element 7, each being present in two different orientations in relation to the longitudinal axis 9. This makes clear the effects of rotary mounting of the signal conductor arrangement 5.

Pairs belonging together are located in the upper and lower rows, each at a first and second position from the left side. Additionally, the embodiments at the second to last position in the upper and last position of the lower row as well as at the last position of the upper and second to last position of the lower row belong together.

Clearly, a partially different measuring geometry in relation to the container or especially to its longitudinal axis 9, along which the medium increases or decreases, results due to the screwing in of the support element 7 during assembly.

This effect is particularly clear in the variations at the second to last and last position: Depending on the angle of rotation, two or three fill levels or can be detected with the same geometry of the emitting devices 6.

In the orientation of the emitting devices 6 in relation to the support element 7, in which the emitting devices are arranged each on a diameter of the circular support element 7 embodiments at first and second position of the two rows, as many fill levels can be detected as there are emitting devices 6. Here, this is two or three fill levels.

An exception then results when all emitting devices 6 are arranged perpendicular to the longitudinal axis 8 of the container. In this case—not shown here—, only one fill level can be monitored, however, as compensation with a correspondingly high redundancy.

The arrangement of the emitting devices 6 in a square for four emitting devices 6 or in the form of a capital V for three emitting devices allows for the monitoring of different amounts of fill levels depending on the rotation or for the redundant monitoring of a fill level or fill level range depending on the rotation.

The dependence of possible measuring levels or the fill levels to be monitored makes the advantage clear, which then results when the type of evaluation of the emitting behavior of the emitting devices 6 is not strictly specified, rather is configured after assembly at the operation site and thus is adapted to the prevailing conditions.

Figure 11:
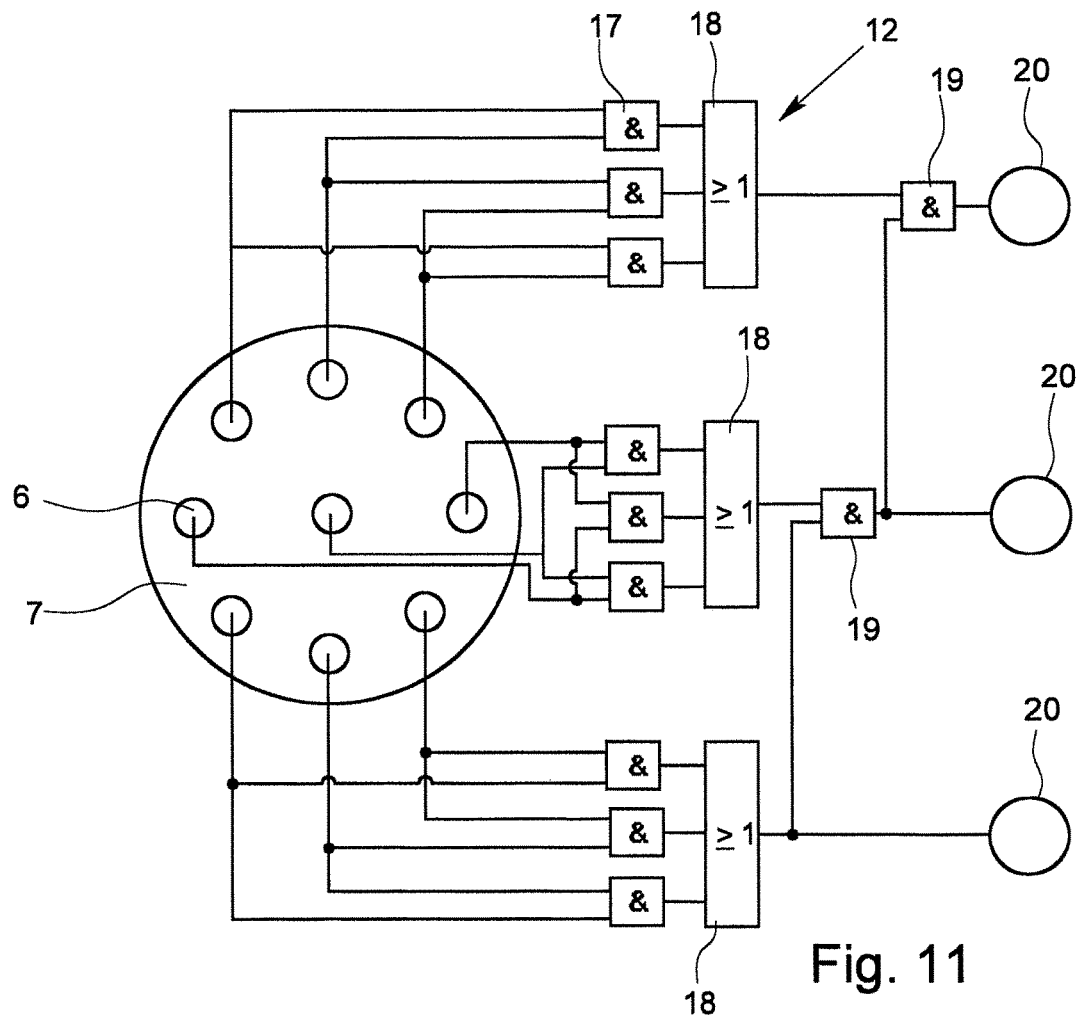
FIG. 11 is a schematic representation of the processing of the emitting devices of a device according to the invention.

A variation is shown purely schematically in FIG. 11, how nine emitting devices 6 on a support element 7 are evaluated together by an implied measuring device 12.

For clarity, all elements and components are left away that are used for the actual detection of the emitting behavior of the emitting devices 6, so that, here, the emitting devices 6 are directly joined to the components of the measuring device 12 in the schematic sketch.

In the following case, it is observed that the device is used for overflow protection and that the fill level of the medium increases from bottom to top in the drawing level.

Furthermore, the emitting devices 6 each then directly generate a signal when they are covered by the medium.

Eight of the nine emitting devices 6 are arranged radially around the circumference on the support element 7. The ninth emitting device 6 is located in the center, around which the other emitting devices 6 are accordingly rotation symmetrically distributed. Overall, three emitting devices 6 lie on one diameter of the support element 7.

It can thereby be identified that the symmetrical distribution of the emitting devices 6 on the support element 7 and their increased number—in relation to, e.g., the embodiments of FIG. 10—allow for a plurality of different mounting situations, i.e., allow for different end positions after rotation, which essentially lead to the same measuring geometry.

The arrangement of the emitting devices 6 in relation to the container and thus also in relation to the possible fill levels of the medium is understood as measurement geometry.

The nine emitting devices 6 are grouped into three groups that each relate to one fill level or fill level range.

The three middle emitting devices 6 are located at one level and are thus used for monitoring a fill level.

The three upper and the three lower emitting devices 6 are each slightly shifted in height in respect to one another, wherein each of the two outer emitting devices 6 are located at the same level and the middle emitting device 6 is located at a position either higher or lower than its neighbor.

In that each of the three emitting devices 6 of the groups are connected to one another or are evaluated together, the three upper or the three lower emitting devices 6 together monitor a fill level range, i.e., a spatial area that is determined by the geometry of the individual emitting devices 6 and their relative distribution.

In the illustrated embodiment, two each of the emitting devices 6 of the groups are connected to one another by a logical "AND" element 17. This means that this "AND" element 17 supplies a logical "one" when both emitting devices 6 generate the same signal.

Thus, if both emitting devices 6 signalize that they are covered by the medium in that this is derived from the respective emitting behavior, e.g., from the resonance frequency, then the assigned "AND" element 17 issues a "one".

Thus, with the "and" element 17, it is monitored whether two emitting devices 6 generate the same signal. Thus, the three emitting devices 6 in one group are connected to one another in terms of redundancy.

An "OR" element 18 is subordinate to the three "AND" elements 17 per group, which generates a signal when at least one of the three "AND" elements 17 issues a positive signal.

The "OR" elements 18 thus combine the individual signals of the emitting devices 6 into one group signal.

The "OR" elements 18, in turn, follow the "AND" elements 19 that connect the group signals of the lower and the middle group or the middle and the upper group to one another in order to control the three signal units 20 that act as a sort of traffic light here.

In the following, a possible order of events is observed for the use as overflow protection.

At the beginning, the medium—not shown here—is, for example, still located below all of the emitting devices 6.

The medium increases and reaches the lowest emitting device 6, which generates a corresponding signal.

However, this is only a signal for the reaching of the fill level range within the lower group, thus no signal is given to the outside that indicates coverage. This is prevented by the two "and" elements 17 accordingly assigned to the emitting device 6.

If the level of the medium continues to rise, then it also reaches the two outer emitting devices 6 of the lower group.

Since, thereby, all three emitting devices 6 signalize coverage, the signal for reaching the fill level range results for the lower group and the lower "or" element 18 can directly actuate the lower signal unit 20 connected to it.

If the fill level of the medium continues to rise, then all three emitting devices 6 of the middle group, which are all arranged at the same level, are covered. Thus, all three generate the signal that the fill level has been reached. The "AND" elements 17 pass this information further via the "OR" element 18 to the subsequent "AND" element 19.

The signal of the middle group and the signal of the lower group are connected to one another via the signal from the "AND" element 19.

Thus, the result of the middle group is checked in respect to plausibility.

The middle signal unit 20 can then only display the reaching of the middle fill level when the lower fill level has also been reached or is subsequently exceeded.

If the fill level continues to increase, then the medium reaches the two outer emitting devices 6 of the upper group, which are connected to one another by the lower "AND" element 17 of the three upper "and" elements 17. Thus, the upper group already generates a signal at this fill level, which then can actuate the upper signal unit 20 in conjunction with the signal of the middle group.

Thus, if the medium is found in the fill level range of the upper group, then all three signal units 20 are lit up.

The components of the measuring device 12 shown here for processing the individual results in respect to the emitting behavior of the emitting devices 6 are designed, as an example, as logic components.

The implementation thereby occurs, in an alternative embodiment, in the form of at least one microprocessor and, in an additional embodiment, in the form of at least one FPGA field programmable gate array.

Figure 12:
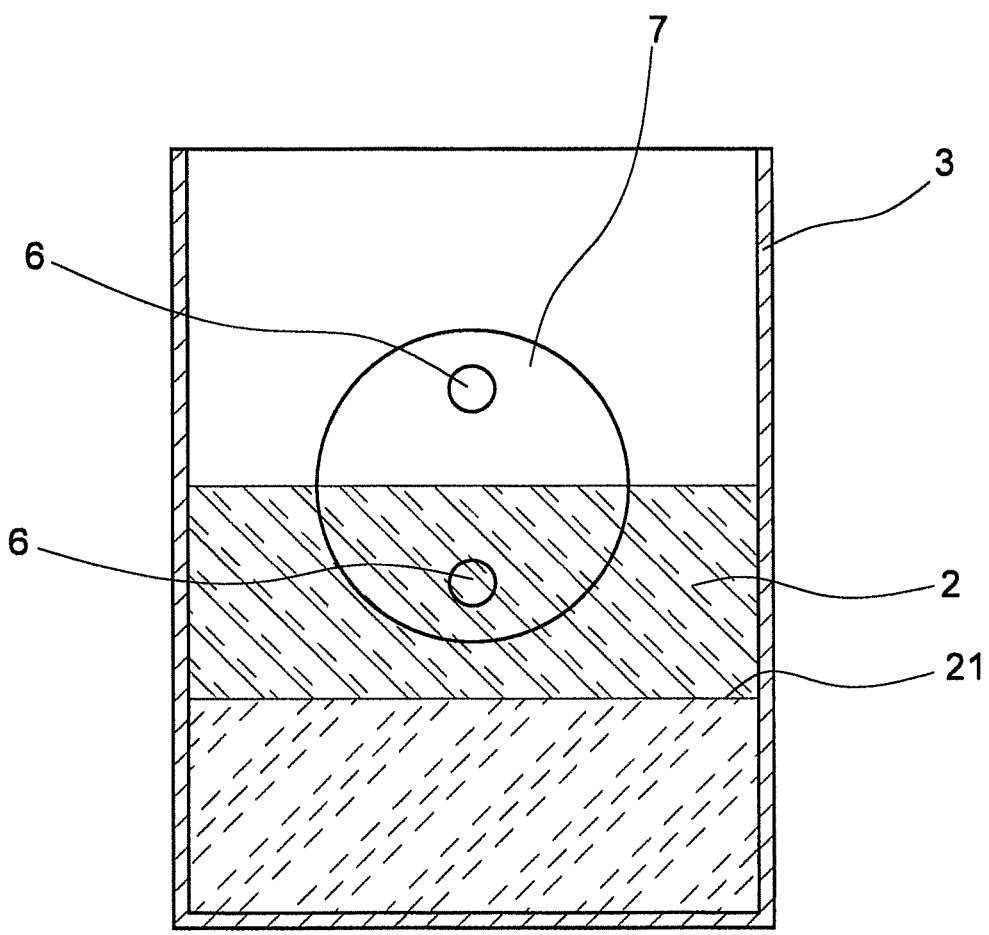
FIG. 12 is a schematic representation of the detection of data via a separation layer with the aid of a device according to the invention.

It is shown in FIG. 12, how the location of a separating layer 21 is identified and detected with the device according to the invention.

Separating layers result when the medium is made up of two substances or phases that do not mix. For example, a medium consisting of oil and water is possible.

One side of a container 3 is shown purely schematically, in whose—here back—wall a support element 7 having two emitting devices 6 is located.

Additionally shown, is the medium 2 in front of the container wall, which consists of substances having a separating layer 21 located between them.

In the shown situation, the upper substance already covers the lower emitting device 6 and approaches the upper emitting device 6.

If the medium 2 continues to increase, then the lower emitting device 6 is, at a certain point in time, no longer covered by the upper substance, but rather the lower substance If the two substances of the medium 2 differ in view of their permittivity, then the change at covering of the lower emitting device 6 leads to a change in the emitting behavior, in particular a change in the resonance frequency.

At a further point in time, the upper substance reaches the upper emitting device 6, which is then not longer free and uncovered, rather is covered, so that its emitting behavior also changes.

Two further time durations are necessary for determined data about the separating layer 21:

This includes a first duration that is found between the points in time at which the emitting devices 6 signalize the change from uncovered, i.e., free, state to a covered state. These are thus the points in time at which the upper substance reaches each of the emitting devices 6.

In combination with the level difference between the two emitting devices 6, the first duration allows for the determination of the increasing or filling speed of the medium 2.

Thereby, the speed at which the medium 2 increases can be determined.

It is assumed, here, that the fill level of the medium 2 increases uniformly and that, e.g that there are no pauses or that the fill level decreases in the meanwhile.

Furthermore, a second duration is also necessary that is located between the points in time, at which a first coverage by the medium or the change of substances is determined by an emitting device.

The second duration is a measure for how fast the upper substance of the two substances extends beyond the assigned emitting device.

Figure 13:
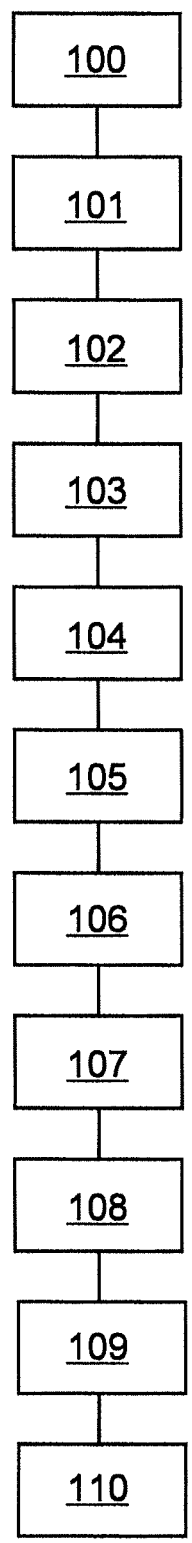
FIG. 13 is a flow chart for the start-up of a device according to the invention.

Steps for start-up of a device according to the invention and, in particular, for free configuration of the evaluation are shown in FIG. 13.

The device—not shown here—thereby has, as an example, five emitting devices, whose orientation relative to the longitudinal axis of the container is not known as a result of the rotary assembly and would be very difficult to determine since the emitting devices are located in the direction of the container interior.

In step 100, the device is mounted at the measuring site in that the support element is screwed into a recess of the container wall.

Depending on the desired end position, the emitting devices are arranged differently to the container or, in particular, to its longitudinal axis and thus relate to different or same fill levels in an unpredictable manner.

In step 101, normal measuring operation is started, without a fill level to be monitored being deliberately approached and only for calibration.

In step 102, the medium reaches an emitting device of the device according to the invention for the first tie—only as an example here—and covers it, so that the emitting behavior of this emitting devices changes noticeably.

This emitting device is thus assigned the lowest fill level in step 103.

In step 104, the medium reaches two other emitting devices that both accordingly signalize that coverage has occurred.

In step 105, it is checked when the lower emitting device is still covered.

In step 106, the information from the lowest emitting device is combined with signals of the two higher emitting devices so that both emitting devices are assigned a common fill level and that both are coupled to one another in the sense of redundancy. Further, the assignment of fill level to emitting devices is carried out.

In step 107, the fill level further increases and reaches two additional emitting devices.

In step 108, it is concluded from the points in time, at which the two last-mentioned emitting devices signalized contact to the medium, that there is a slight level difference between the two, since there is a time difference between the signals.

In step 109, the two emitting devices are assigned to one group despite the difference and thus also to one fill level range and not to a narrower fill level.

In step 110, the signals from all emitting devices are compared to one another again and calibration is finalized, after the resonance frequencies determined by the individual emitting devices in the case of coverage have been determined and reset.

Figure 14:
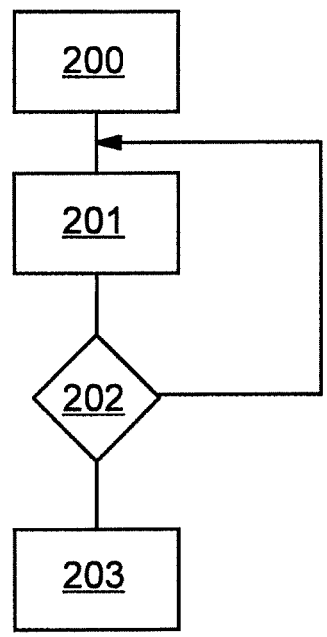
FIG. 14 is a schematic flow chart of the self-monitoring of a device according to the invention and FIG. 15 is a schematic flow chart in respect to the evaluation of the behavior of an emitting device.

FIG. 14 shows several steps for identifying a contamination of—not shown here—emitting devices.

In step 200, the resonance frequency is measured in the covered state of an emitting device.

In step 201, a new measurement of the resonance frequency of the emitting device occurs for self-monitoring after a given duration, for which it is necessary that the covered state exists. For example, the measuring signals of the remaining emitting devices are used for this.

In step 202, the current frequency value is compared to the stored value.

If the values are located within a tolerance range, then there is a return to step 201 and the frequency measurement is repeated at the given time.

However, if there is a deviation beyond the tolerance range, then it is shown in step 203 that the emitting device is no longer in a correct state and, in particular, is contaminated.

Figure 15:
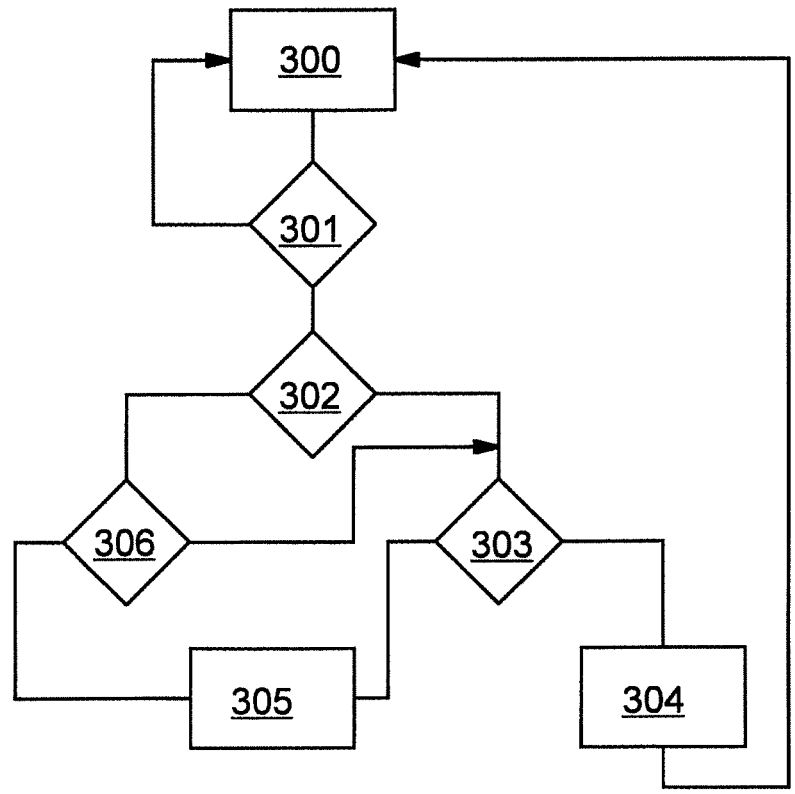

FIG. 15 shows a general course for the processing of the emitting behavior of an emitting device.

A measure for the emitting behavior of the emitting device is determined in step 300. This is, for example, the resonance frequency.

In step 301, this measure is compared to a stored value and it is determined whether a change exists.

If there is no change, step 300 begins again.

In the case of a change, it is checked in step 302, whether the chosen emitting device is to be considered together with further emitting devices in the sense of redundancy.

If this is not the case, a plausibility check is carried out in step 303.

For example, it is checked, whether the result resulting from the change in emitting behavior of the chosen emitting device agrees with the information of the other emitting devices. If, e.g., the change from "uncovered" to "covered" results, then the emitting devices assigned lower fill levels have to report coverage.

If this plausibility is fulfilled, then it is signalized in step 304 that the fill level of the medium associated with the emitting device has been reached.

However, if there are discrepancies, an error message occurs in step 305.

If it is seen in step 302, that there are further emitting devices that are assigned the same fill level or fill level range, then a corresponding comparison is carried out in step 306.

If the redundancy check in step 306 shows that the state signalized by the change in the emitting behavior of the emitting device agrees with that of the other emitting devices connected to one another by redundancy, then the plausibility check is carried out in step 303.

However, if there are differences, then an error message is also generated in step 305 in the shown embodiment.

Step 304 then finally followed again by step 300.

What is claimed is:

1. A device for determining the fill level of a medium in a container, comprising:
   at least one electronic device, and
   at least one signal conductor arrangement,
      wherein the at least one electronic device is constructed for supplying the at least one signal conductor arrangement with electromagnetic signals,
      wherein the at least one signal conductor arrangement has a plurality of emitting devices,
      wherein the emitting devices are attached to a support element, wherein the support element is constructed for being inserted into a side wall of a container, wherein the at least one electronic device is adapted for emitting the electromagnetic signals in the interior of the container during operation, wherein the at least one electronic device is adapted for providing at least one measure for an emitting behavior of the plurality of emitting devices, wherein the electronic device is adapted for supplying the plurality of emitting devices with the electromagnetic signals with a predeterminable frequency, wherein the predeterminable frequency essentially corresponds to a resonance frequency of the emitting devices either when out of contact with the medium or when covered by the medium.

2. Device according to claim 1, wherein the electronic device is adapted for evaluating at last one impedance behavior of the at least one emitting device for the measure.

3. The device according to claim 1, wherein the electronic device has at least one reflector circuit.

4. The device according to claim 3, wherein the reflector circuit is constructed to be able to monitor the adaptation of at least one emitting device when supplying the electromagnetic signals.

5. The device according to claim 3, wherein the reflector circuit is assigned to exactly one emitting device and is adapted for providing a measure for the emitting behavior of the assigned one emitting device.

6. The device according to claim 1, wherein, based on the emitting behavior of the emitting device, the electronic device is adapted to determine a conclusion about the medium in addition to a fill level.

7. The device according to claim 6, wherein the conclusion determined by the electronic device in addition to the fill level is a permittivity of the medium.

8. The device according to claim 1, wherein a support element at least partially supports the signal conductor arrangement.

* * * * *